(12) United States Patent
Smith et al.

(10) Patent No.: US 9,071,672 B2
(45) Date of Patent: Jun. 30, 2015

(54) MAGNETIC SYSTEMS FOR ELECTRONIC DEVICES AND ACCESSORIES

(71) Applicant: Apple Inc., Cupertino, CA (US)

(72) Inventors: Samuel G. Smith, Cupertino, CA (US); Jared A. Sartee, Saratoga, CA (US); Florence W. Ow, San Francisco, CA (US); Andrew D. Lauder, Oxford (GB); Jeremy C. Franklin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/589,917

(22) Filed: Jan. 5, 2015

(65) Prior Publication Data

US 2015/0119114 A1    Apr. 30, 2015

Related U.S. Application Data

(63) Continuation of application No. 13/612,175, filed on Sep. 12, 2012, now Pat. No. 8,953,310.

(60) Provisional application No. 61/681,117, filed on Aug. 8, 2012.

(51) Int. Cl.
*G06F 1/16* (2006.01)
*H04M 1/02* (2006.01)
*H04B 1/3888* (2015.01)

(52) U.S. Cl.
CPC ........... *H04M 1/0266* (2013.01); *H04B 1/3888* (2013.01)

(58) Field of Classification Search
CPC ... G06F 1/1616; G06F 1/1677; G06F 1/1679; G06F 1/1626; G06F 2200/1633; G06F 1/1652; G06F 1/1613; G06F 1/1622; G06F 1/1628; G06F 1/1641; G06F 1/1669; G06F 3/041; G06F 3/0412; G06F 3/0488; G06F 1/16; G06F 1/1603; G06F 1/1607; G06F 1/1618; G06F 1/1637; G06F 1/181; E05C 19/16; H01F 7/04; H01F 7/0242; H01F 7/0284; H01F 41/02; H01F 27/365; H01F 7/0236; A45C 2011/003; A45C 2011/002; A45C 13/002; A45C 13/005; A45C 13/1069
USPC .................. 361/679.02, 679.58, 810, 679.21; 455/566; 174/391
See application file for complete search history.

(56) References Cited

U.S. PATENT DOCUMENTS

| | | | | |
|---|---|---|---|---|
| 7,541,907 B2 * | 6/2009 | Wang et al. | .................. | 335/305 |
| 8,143,982 B1 * | 3/2012 | Lauder et al. | ................. | 335/219 |
| 8,242,868 B2 * | 8/2012 | Lauder et al. | ................. | 335/219 |
| 8,253,518 B2 * | 8/2012 | Lauder et al. | ................. | 335/219 |
| 8,264,310 B2 * | 9/2012 | Lauder et al. | ................. | 335/219 |
| 8,289,115 B2 * | 10/2012 | Cretella et al. | ................ | 335/219 |
| 8,746,446 B2 * | 6/2014 | Chiang | ......................... | 206/320 |
| 2004/0196045 A1 * | 10/2004 | Larsen | .......................... | 324/329 |
| 2008/0278269 A1 * | 11/2008 | Ramirez et al. | ............... | 335/205 |
| 2010/0238620 A1 * | 9/2010 | Fish | ......................... | 361/679.09 |

(Continued)

*Primary Examiner* — Robert J Hoffberg
*Assistant Examiner* — Michael Matey
(74) *Attorney, Agent, or Firm* — Downey Brand LLP

(57) ABSTRACT

A cover is described that is magnetically attached to a tablet device. The cover includes at least as flap. In the described embodiment, the flap includes a plurality of segments where the first segment includes a first plurality of edge attach magnets arrayed along a first edge of the flap and where a second segment includes a second plurality of edge attach magnets arrayed along a second edge of the flap opposite the first edge.

16 Claims, 25 Drawing Sheets

(56) References Cited

U.S. PATENT DOCUMENTS

| | | | |
|---|---|---|---|
| 2011/0316655 A1* | 12/2011 | Mehraban et al. | 335/207 |
| 2012/0066865 A1* | 3/2012 | Lauder et al. | 16/382 |
| 2012/0066873 A1* | 3/2012 | Lauder et al. | 24/303 |
| 2012/0068797 A1* | 3/2012 | Lauder et al. | 335/285 |
| 2012/0068798 A1* | 3/2012 | Lauder et al. | 335/306 |
| 2012/0068799 A1* | 3/2012 | Lauder et al. | 335/306 |
| 2012/0068919 A1* | 3/2012 | Lauder et al. | 345/156 |
| 2012/0068942 A1* | 3/2012 | Lauder et al. | 345/173 |
| 2012/0069502 A1* | 3/2012 | Lauder et al. | 361/679.01 |
| 2012/0069503 A1* | 3/2012 | Lauder et al. | 361/679.01 |
| 2012/0069540 A1* | 3/2012 | Lauder et al. | 361/807 |
| 2012/0072167 A1* | 3/2012 | Cretella et al. | 702/150 |
| 2012/0194308 A1* | 8/2012 | Lauder et al. | 335/219 |
| 2012/0194448 A1* | 8/2012 | Rothkopf | 345/173 |
| 2013/0027867 A1* | 1/2013 | Lauder et al. | 361/679.29 |
| 2013/0063873 A1* | 3/2013 | Wodrich et al. | 361/679.01 |
| 2013/0076614 A1* | 3/2013 | Ive et al. | 345/156 |
| 2013/0149964 A1* | 6/2013 | Kreiner | 455/41.2 |

* cited by examiner

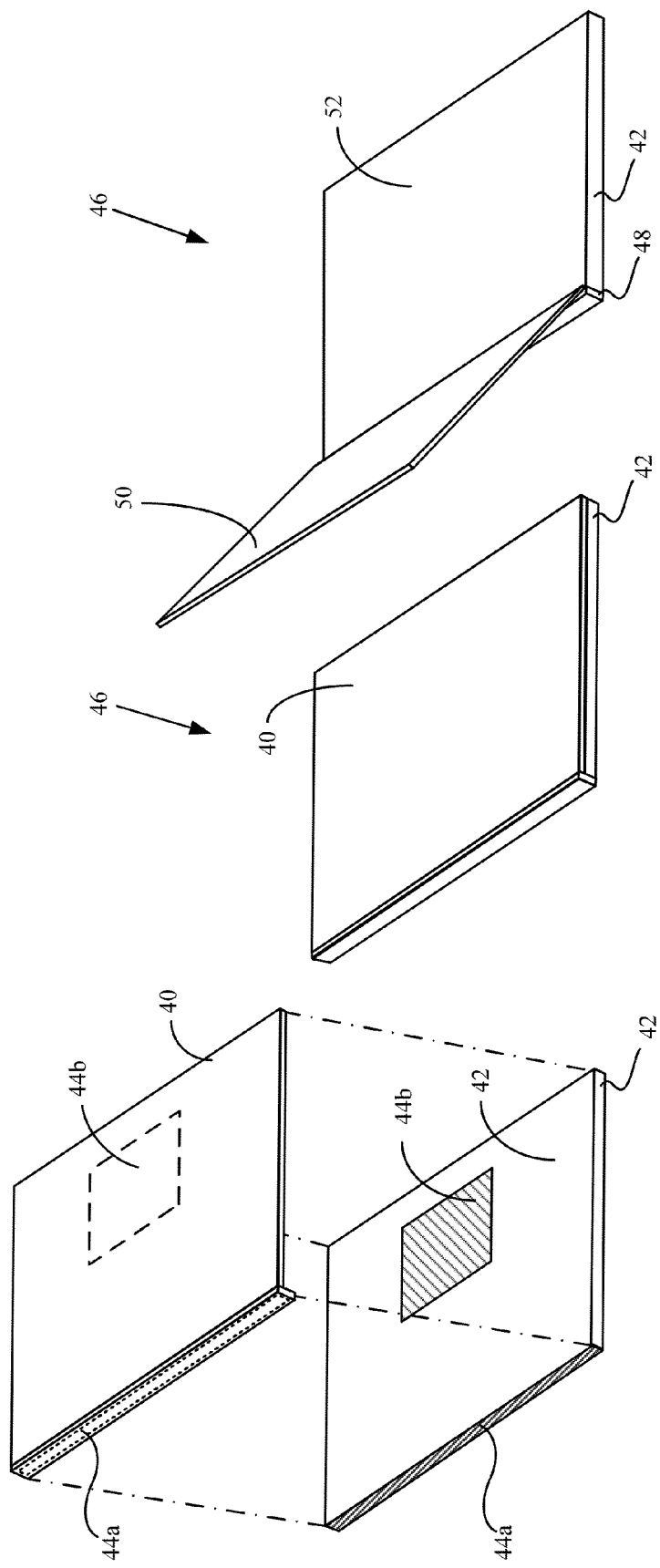

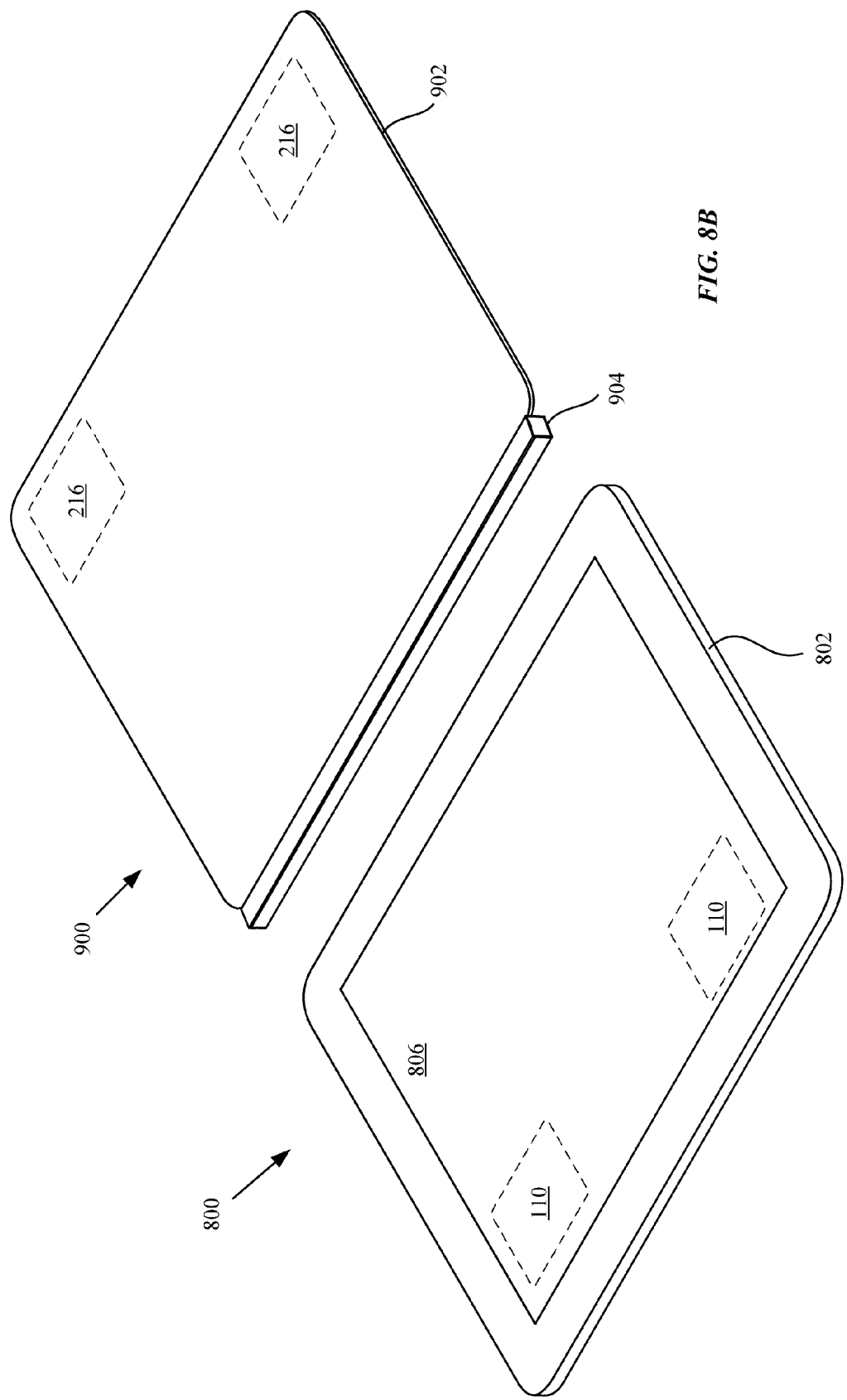

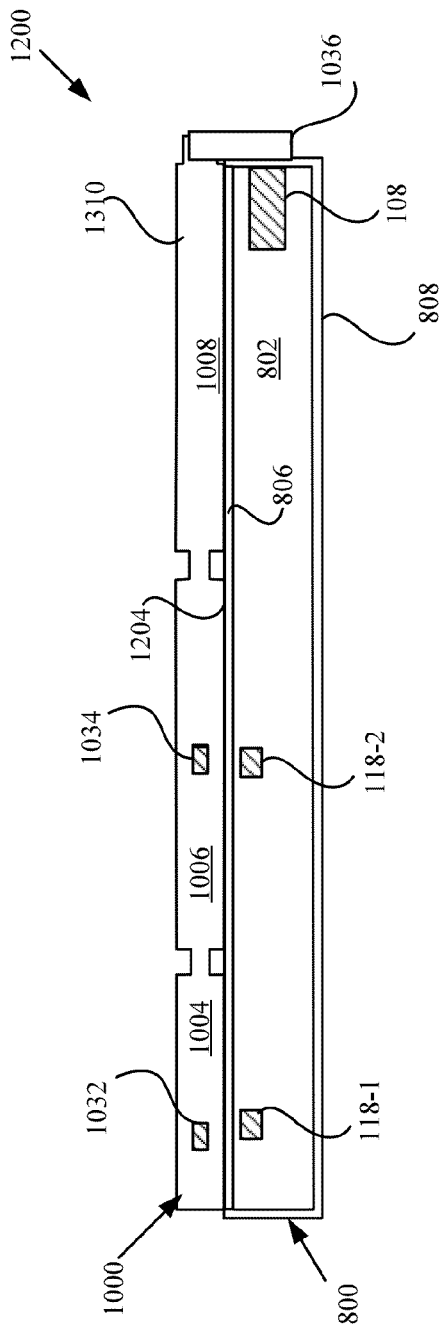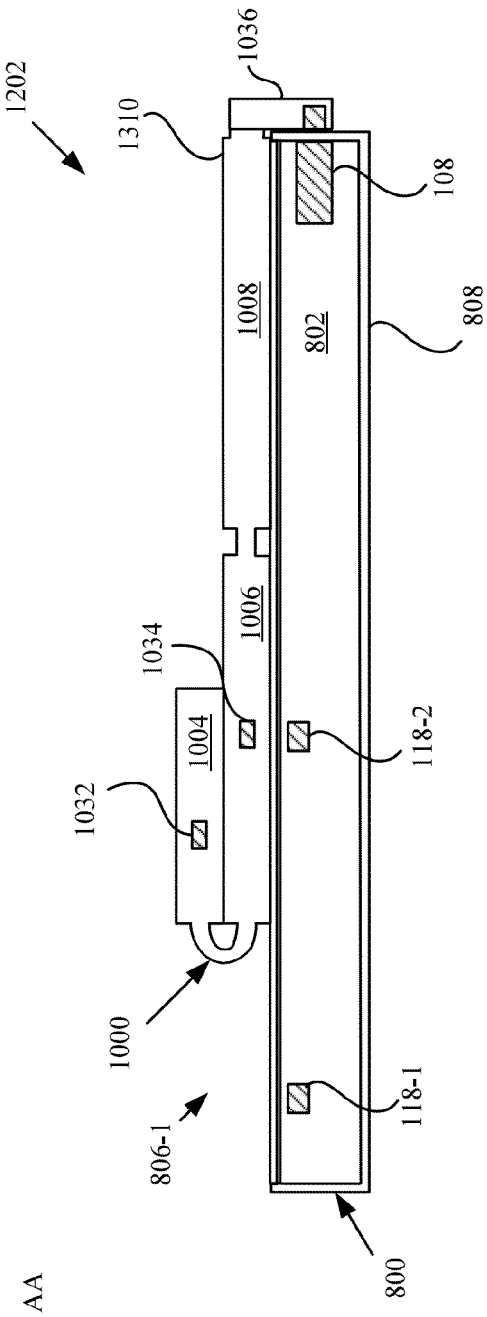

MAGNETIC SYSTEMS FOR ELECTRONIC DEVICES AND ACCESSORIES

CROSS REFERENCE TO RELATED APPLICATIONS

This application is a continuation of U.S. application Ser. No. 13/612,175, filed Sep. 12, 2012, of the same title, which claims the benefit of U.S. Provisional Patent Application No. 61/681,117, filed Aug. 8, 2012 and entitled "Consumer Electronic Product," which are incorporated by reference in their entirety for all purposes.

FIELD

The described embodiments generally relate to portable electronic devices. More particularly, the present embodiments describe various releasable attachment techniques well suited for portable electronic devices.

BACKGROUND

Recent advances in portable computing includes the introduction of hand held electronic devices and computing platforms along the lines of the iPad™ tablet manufactured by Apple Inc. of Cupertino, Calif. These handheld computing devices can be configured such that a substantial portion of the electronic device takes the form of a display assembly used for presenting visual content. The display assembly generally includes an active display area configured to present visual content and a top protective layer used to provide protection against external effects, such as would be expected during normal use. However, in some cases, additional protection can be afforded both the tablet device and display assembly using a separate accessory device that takes the form of a protective cover attached to the tablet device. However, due to the relatively large size of the display in relation to the tablet device as a whole, little space is available for attaching the protective cover to the tablet device.

Moreover, conventional attachment mechanisms such as mechanical fasteners, clasps, and so forth typically require an externally accessible attaching feature on the electronic device to mate with a corresponding attaching feature on the accessory device. This arrangement can detract from the overall look and feel of the handheld computing device as well as add unwanted weight and complexity as well as degrade the appearance of the hand held computing device.

Therefore what is desired are magnetic systems that facilitate the use of an accessory device with a tablet device.

SUMMARY

This paper describes various embodiments that relate to a system, method, and apparatus for releasably attaching an accessory to an electronic device.

A magnetic system suitable for use in a protective cover having a foldable flap formed of a layer of finishing material, the protective cover used in cooperation with a tablet device having a display is described. The magnetic system includes at least a first array of edge attach magnets aligned with a first edge of the foldable flap cover, a second array of edge attach magnets aligned with a second edge of the foldable flap and aligned with the first array of edge attach magnets, wherein the first and second array of edge attach magnets form a magnetic circuit that maintains a folded configuration of the protective cover, and a plurality of field shaping magnets disposed at selected locations on the magnetic cover such that magnetic fields from the plurality of field shaping magnets interact with magnetic fields from the first array of edge attach magnets to effectively provide essentially a null magnetic field at least one predefined position corresponding to a magnetically sensitive circuit disposed in the tablet device.

In another embodiment a consumer system is described. The consumer system includes at least a tablet device that includes a housing having a front opening, a display assembly disposed within the front opening that includes a display and a top protective layer disposed adjacent to the display. The tablet device also includes a plurality of sensors configured to detect a corresponding stimulus, and a first magnetic attachment system disposed within and secured to an inside side wall of the housing, the first magnetic attachment system configured to provide a variable magnetic surface at an exterior of the housing in response to an appropriately configured external magnetic field. The consumer system also includes a cover, that includes at least a segmented flap formed of a layer of protective finishing material having a size and shape in accordance with the display, an integrated hinge comprising a flexible hinge formed of a continuous layer of the layer of finishing material, and a second magnetic attachment unit configured to provide the appropriately configured magnetic field to the first magnetic attachment system, wherein the first magnetic attachment system interacts with the appropriately configured magnetic field by transitioning from an inactive state to an active state, wherein in the active state the first magnetic attachment system provides a first magnetic surface at an exterior of the housing suitable for forming a magnetic attachment with the second magnetic attachment system.

In yet another embodiment a method of magnetically attaching a tablet device and a protective cover is described. The tablet device includes a housing and a first magnetic attachment system having a first plurality of magnets and a magnetic shield disposed between the first plurality of magnets and an interior of a first side wall of the housing and the protective cover includes a second magnetic attachment system having a second plurality of magnets. The method is carried out by causing the first magnetic attachment system to transition from an inactive state to an active state, and forming a magnetic attachment between the first magnetic attachment system and the second magnetic attachment system in response to the transition to the active state.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which:

FIG. 4A is a simplified perspective view of an article that is releasably attachable to an electronic device via the top and side magnetic attachment systems.

FIG. 4B shows a cooperating system of the attached article and the electronic device shown in FIG. 4A in a closed configuration.

FIG. 4C shows the cooperating system of FIG. 4B in an open configuration.

FIG. 8B shows a second perspective view of the electronic device in the form of a tablet device and the accessory device in the form of a protective cover.

FIGS. 12A-12D show representative cross sectional views of segmented cover assembly/tablet device along line AA shown in FIG. 10A.

DETAILED DESCRIPTION

Figure 1:
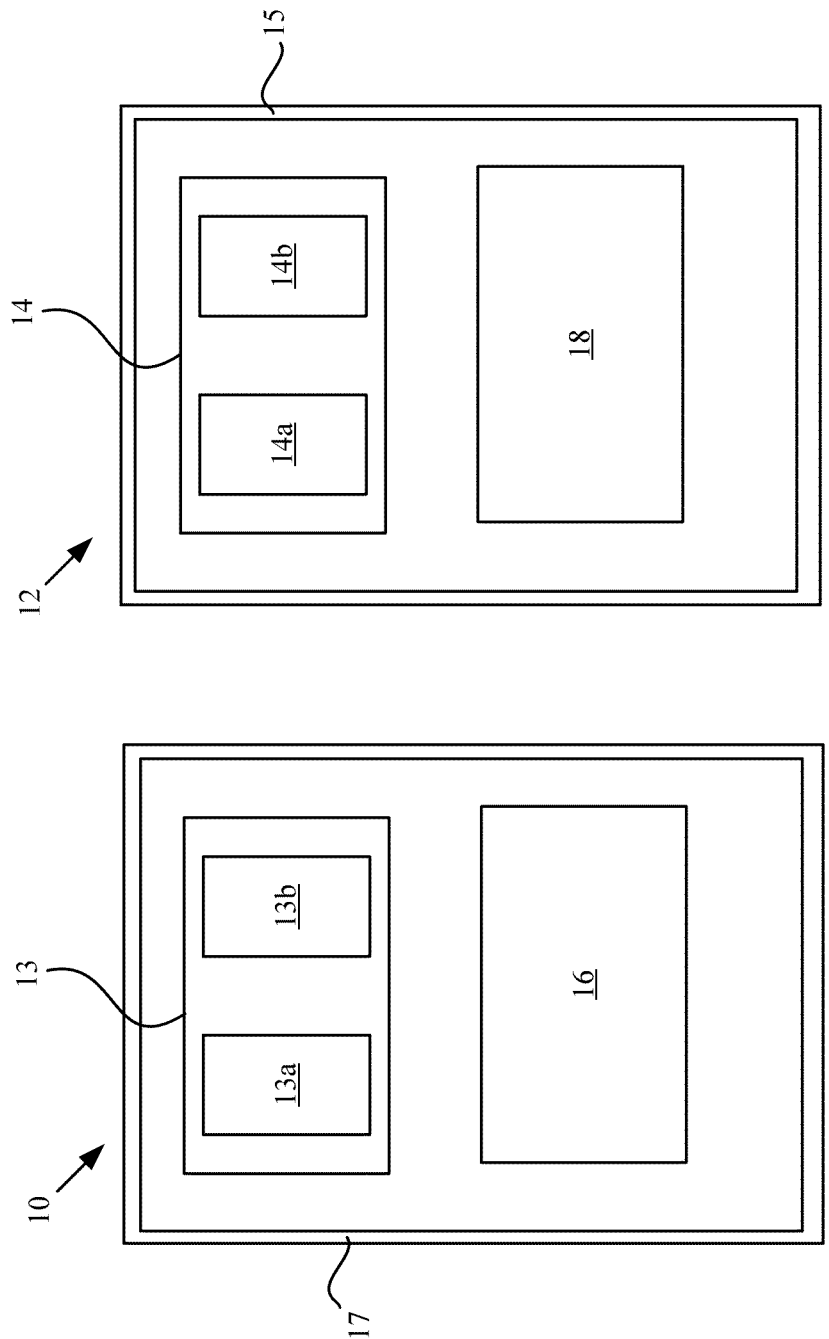
FIG. 1 is a simplified block diagram of an article and an electronic device that can be releasably attached to each other in a desired and repeatable manner.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a mechanism that can be used to attach together at least two suitably configured objects. In one embodiment, this can be accomplished without the use of conventional fasteners. Each of the objects can include an attachment feature arranged to provide a magnetic field having appropriate properties. When the attachment features are brought into proximity with each other, the magnetic fields can cooperatively interact based upon their respective properties, result in the objects magnetically attaching to each other in a desired and repeatable manner. For example, due at least in part to the cooperative nature of the interaction of the magnetic fields, the objects can attach to each other in a pre-determined position and relative orientation without external intervention. For example, the cooperative magnetic interaction can result in the objects self-aligning and self-centering in a desired orientation.

The objects can remain in the magnetically attached state if and until a releasing force of sufficient magnitude is applied that overcomes the overall net attractive magnetic force. In some cases, however, it can be desirable to detach the objects serially (along the lines of a zipper) in which case, the releasing force only need be of sufficient magnitude to overcome the net magnetic attractive force of one pair of magnetic elements at a time. Connectors such as mechanical fasteners are not required to attach the objects together. Furthermore, to prevent undue interference to the magnetic interaction between the magnetic attachment features, at least a portion of the objects in the vicinity of the magnetic attachment features can be formed of magnetically inactive materials such as plastic or non-ferrous metals such as aluminum or non-magnetic stainless steel.

The objects can take many forms and perform many functions. When magnetically attached to each other, the objects can communicate and interact with each other to form a cooperative system. The cooperating system can perform operations and provide functions that cannot be provided by the separate objects individually. In another embodiment, at least one device can be used as an accessory device. The accessory device can be magnetically attached to at least one electronic device. The accessory device can provide services and functions that can be used to enhance the operability of the electronic device(s). For example, the accessory device can take the form of a protective cover that can be magnetically attached to the electronic device. The protective cover can provide protection to certain aspects (such as a display) of the electronic device while enhancing the overall look and feel of the electronic device. The magnetic attachment mechanism used to magnetically attach the accessory and the electronic device can assure that the cover can only attach to the electronic device in a specific orientation. Moreover, the magnetic attachment mechanism can also assure proper alignment and positioning of the protective cover and the electronic device.

The protective cover can include at least a flexible hinge portion. The flexible hinge portion can include a flexible body, or tail, connected to a magnetic attachment mechanism that can include a plurality of magnets. A magnetic field provided by the magnets in the magnetic attachment mechanism can interact with a corresponding magnetic field provided by magnets in the electronic device. In this way, the hinge portion can be pivotally connected to the electronic device using only the magnets. In one embodiment, the protective cover can include a flap that is connected to the flexible hinge portion. The flap can therefore be smoothly rotated along a pivot line formed by the flexible hinge portion. When magnetically coupled to the tablet device, the smooth rotation of the flap about the pivot line can bring the flap in substantial contact with the display in a fully closed position. The flap can also be smoothly rotated about the pivot line to reveal most or all of the display. In one embodiment, the flap can be segmented by which it is meant that the flap can be divided into distinct portions that can fold and bend with respect to each other as well as the tablet device more specifically in some cases, the display. In this way, the segmented flap affords an additional option of revealing only specific portions of the display by folding individual segments to reveal a corresponding portion of the display while other segments remain in contact and therefore obscuring the display.

In some embodiments, the flap can include a variety of magnets that can be used to form a number of structures well suited for use with the electronic device. For example, the flap can include a first plurality of magnets linearly arrayed along a first edge (i.e., first edge magnets) and a second plurality of magnets positioned in corresponding locations along a second edge opposite the first edge (second edge magnets). In a particular embodiment, corresponding ones of the first and second edge magnets have opposite polarities. In this way, when the first edge and the second edge are brought into spatial proximity to each other, magnetic fields of the first and second edge magnets interact with each other to form a magnetic attractive force that causes the first and second edges to attach to each other. In this way, the flap can form a structure that can be used to enhance the functionality of the cover with regards to the electronic device.

For example, if the flap is constructed to have three independently foldable segments (referred to as segment A, segment B, and segment C) where segment A is attached to the foldable hinge at the first edge having the first edge magnets and segment C is opposite segment A that is defined in part by the second edge having the second edge magnets, a triangular structure ABC can be formed when the first edge magnets and the second edge magnets attract each other when segment A is within proximity to segment C. It should be noted that the properties of the triangular structure ABC can vary in accordance with the relative sizes of the segments A, B, and C. In other words, is segments A, B, and C are about equal in width, then triangular structure ABC can take the form of an equilateral triangle, whereas if two segments are about of equal width, then the triangular structure ABC can take on the shape of an isosceles triangle. It should be noted that in some embodiments, the triangular structure can be used to present the display at an angle of about 5-15° in a keyboard mode well suited for using a keyboard presented at the display or about 65-80° in a movie mode well suited for viewing visual content presented at the display at a comfortable viewing angle.

In one embodiment, the flap can include electronic circuits or other elements (passive or active) that can cooperate with electronic elements in the electronic device. As part of that cooperation, signals can be passed between the protective cover and the electronic device that can, for example, be used to modify operations of the electronic device, operations of electronic circuits or elements of the protective cover, and so forth. As an example, the electronic device can include one or more magnetically sensitive circuits such as a Hall Effect sensor and as such can detect the presence of a magnetic field. The Hall Effect sensor can respond to properties of a magnetic field (such as the presence of magnetic field, a magnetic field strength, polarity, etc.) by generating a signal. The signal can be used to alter an operating state of the electronic device.

Accordingly, the protective cover can include a magnetic element, or elements, such as a permanent magnet having a magnetic field that can be detected the Hall Effect sensor to generate the signal. The magnet(s) can be positioned in the protective cover in various locations in the flap that can be detected by the magnetic sensors when the magnets are proximate to the corresponding magnetic sensor. The magnetic sensors can send information to a processor in the electronic device that can evaluate the signals from the multiple sensors. The evaluation of the signals from the sensors can provide the processor with information that can be used to determine a spatial relationship between the flap and the electronic device or even if the protective cover is attached to the electronic device. For example, the processor can use the signals from the sensors to indicate a relative position of the flap to the electronic device and in response alter an operating state of the electronic device accordingly. For example, when the signals indicate that the flap is fully closed (i.e.; both magnetic sensors detect a corresponding magnetic field), then the processor can prevent the display from presenting visual content. On the other hand, if one sensor detects the corresponding magnetic field and the other sensor does not detect the corresponding magnetic field, then the processor can use this information to determine that only a portion of the display is viewable (that portion of the display corresponding to the portion of the flap having the magnet that is not detectable by the sensor). In this situation, the processor can cause the display to present visual content at only the viewable portion of the display.

These and other embodiments are discussed below with reference to FIGS. 1-18. However, those skilled in the art will readily appreciate that the detailed description given herein with respect to these figures is for explanatory purposes only and should not be construed as limiting. For the remainder of this discussion, a first and second object each suitably configured to magnetically attach to each other in accordance with the described embodiments will be described. It should be noted, however, that any number and type of suitably configured objects can be magnetically attached to each other in a precise and repeatable manner. In particular, for simplicity and clarity, for the remainder of this discussion, the first object is presumed to take the form of an electronic device and in particular a handheld electronic device. The handheld electronic device can, in turn, take the form of a tablet device, portable media player, and so forth.

FIG. 1 is a simplified block diagram of article 10 and electronic device 12 that can be releasably attached to each other in a desired and repeatable manner. More specifically, article 10 and electronic device 12 can attach to each other at a pre-determined position and relative orientation without external intervention and without the use of mechanical fasteners. Article 10 and electronic device 12 can remain attached to each other if and until a releasing force is applied that overcomes the engagement between them. In some cases, however, it can be desirable to detach article 10 and electronic device 12 serially (along the lines of a zipper) in which case, a releasing force can be applied that can undo the engagement between article 10 and electronic device 12 about one attachment component at a time. For example, an attachment component can include a suitably matched pair of magnetic elements, one in article 10 and a second in electronic device 12.

Electronic device 12 can take many forms. For example, electronic device 12 can take the form of a portable electronic device. In some examples, the portable electronic device can include housing 15. Housing 15 can enclose and provide support for components of the portable electronic device. Housing 15 can also provide support for at least a large and prominent display occupying a substantial portion of a front face of the portable electronic device. The display can be used to present visual content. The visual content can include still images, visual, textual data, as well as graphical data that can include icons used as part of a graphical user interface, or GUI.

In some cases, at least a portion of the display can be touch sensitive. By touch sensitive it is meant that during a touch event, an object (such as a finger, stylus, and so on) can be placed in contact with or in proximity to an upper surface of the display. The particulars of the touch event (location, pressure, duration, and so forth) can be used to provide information to the portable electronic device for processing. In some embodiments, in addition to or in place of information being provided to the portable electronic device, information can be provided by the portable electronic device in a tactile manner using, for example, haptic actuators. It should be appreciated however that this configuration is by way of example and not by way of limitation as the electronic device can be widely varied. In one example, the portable electronic device is a tablet device such as, for example, the iPad™ manufactured by Apple Inc. of Cupertino, Calif.

Article 10 can be widely varied and can take many forms such as, for example, an accessory or accoutrement of electronic device 12. As an accessory, article 10 can be configured as a cover, a stand, a dock, a hanger, an input/output device and so on. In a particularly useful form, article 10 can take the form of a protective cover that can include a member, such as a flap, that can be positioned over the display of the portable electronic device. Like the electronic device 12, the article 10 can also include housing 17 that can enclose and provide support for components of the article 10.

Either one or both of article 10 and electronic device 12 can include attachment features. For example, article 10 can include attachment system 13 and electronic device 12 can include corresponding attachment system 14. Attachment system 13 can cooperate with corresponding attachment system 14 to attach article 10 and electronic device 12 in a releasable manner. When attached to each other, article 10 and electronic device 12 can operate as a single operating unit. On the other hand, in the detached mode, article 10 and electronic device 12 can act separately, and if desired, as two individual parts. Attachment systems 13 and 14 can be configured in such a way that article 10 and electronic device 12 can attach to each other in a desired and repeatable manner. In other words, attachment systems 13 and 14 can repeatedly align article 10 and electronic device 12 together such that they are consistently in a pre-determined position relative to one another.

The attachment features can be widely varied. The attachment can be provided by various types of couplings including mechanical, electrical, static, magnetic, frictional, and/or the like. In one embodiment, the attachment cannot be seen from the outside of the article and/or electronic device. For example, the article and device can not include external visible attachment features that adversely affect the look and feel or ornamental appearance (e.g., snaps, latches, etc.), but rather attachment features that cannot be seen from the outside of the article or device and thus do not affect the look and feel or ornamental appearance of the article or device. By way of example, the attachment features can be provided by attraction surfaces that do not disturb the external surfaces of the article or device. In one embodiment, at least a portion of the attachment features utilize magnetic attraction to provide some or all of the attaching force.

The attachment systems can include one or more attachment features. If multiple features are used, the manner in which they secure can be the same or different. For example, in one implementation, a first attachment feature utilizes a first attachment mechanism while a second attachment feature utilizes a second attachment mechanism that is different than the first attachment mechanism. For example, the first attachment mechanism can utilize a friction coupling while the second attachment means can utilize magnetism. For example, the first and second attachment mechanisms can be provided by magnets. Although, the attachment mechanisms can be similar it should be appreciated that the configuration of the mechanisms can be different depending on the needs of the system. Further, any number and configuration of attachment mechanisms can be used.

In the illustrated embodiment, the attachment systems 13 and 14 each include at least a first set of corresponding attachment features 13a/14a and a second set of corresponding attachment features 13b/14b. Attachment feature 13a can cooperate with corresponding attachment feature 14a to attach article 10 and electronic device in a releasable manner. In one particular implementation this is accomplished with magnetic attraction. Further, attachment feature 13b can cooperate with corresponding attachment feature 14b to further attach article 10 and electronic device in a releasable manner. In one particular implementation this is accomplished with magnetic attraction. By way of example, attachment features 13a/14a can be provided at a first location while attachment features 13b/14b can be provided at a second location.

In a specific example, attachment feature 14a can, in cooperation with attachment feature 13a, secure electronic device 12 to article 10. In another example, attachment feature 13b can secure article 10 to the electronic device 12 using attachment feature 14b. It should be noted that the attachment systems 13 and 14 of this example can be separate or they can cooperate together to produce the attachment. If they cooperate, attachment features 14a and 14b correspond to or mate with one or more attachment features 13a and 13b. In any case, the attachment features in any of these examples can be accomplished through mechanical, static, suction, magnetic attachment and/or the like.

The placement of the attachment systems and the attachment features within the attachment systems can be widely varied. Regarding electronic device 12, attachment system 14 can be placed on front, back, top, bottom, and/or sides. Attachment features 14a and 14b can be placed any location within attachment system 14. Accordingly, attachment features 14a and 14b can be placed anywhere relative to the housing and/or the display. In one example, the attachment features 14a and 14b can provide engagement along one or more of the sides of the housing (e.g., top, bottom, left, right). In another example, attachment features 14a and 14b can provide engagement at the back of electronic device 12. In yet another example, attachment features 14a and 14b can provide engagement at the front (e.g., where, if present, a display is located) of electronic device 12. In some cases, a combination of attachment features can be located at different regions of electronic device 12 as for example at the sides and front. In one embodiment, attachment system 14 including attachment features 14a and 14b do not disturb the surfaces of electronic device 12. Similarly, attachment system 13 and in particular attachment features 13a and 13b do not disturb the surfaces of article 10.

In accordance with one embodiment, the attachment features can include magnetic elements. The magnetic elements can be configured to help in positioning article 10 relative to electronic device 12 into a mating arrangement. The magnetic elements can further help to secure article 10 and electronic device 12 into a mating engagement. It should be noted that the engagement of article 10 and electronic device 12 can be reversed by the application of an appropriate releasing force that allows article 10 and electronic device 12 to separate back into individual objects. However, the magnetic elements can permit the article 10 and electronic device 12 to subsequently resume the mating engagement without the requirement of fasteners of any sort, mechanical or otherwise. In this way, the magnetic elements provide a repeatable and consistent engagement between article 10 and electronic device 12.

Article 10 and electronic device 12 can further include components 16 and 18 respectively. Components 16 and 18 typically depend on the configuration of article 10 and electronic device 12 and can, for example, be mechanical or structural components used to provide support or they can be operational/functional components that can provide a specific set of operations/functions. The components can be dedicated to their respective devices or they may be configured for coupling with aspects of the corresponding article or device (e.g., wired or wireless). Examples of structural components can include frames, walls, fasteners, stiffeners, movement mechanisms (hinge), etc. Examples of operational components can include processors, memory, batteries, antennas, circuitry, sensors, display, inputs, and so on. Depending on their desired configuration, the components can be external (i.e., exposed at the surface) and/or internal (e.g., embedded within housing).

Figure 2A:
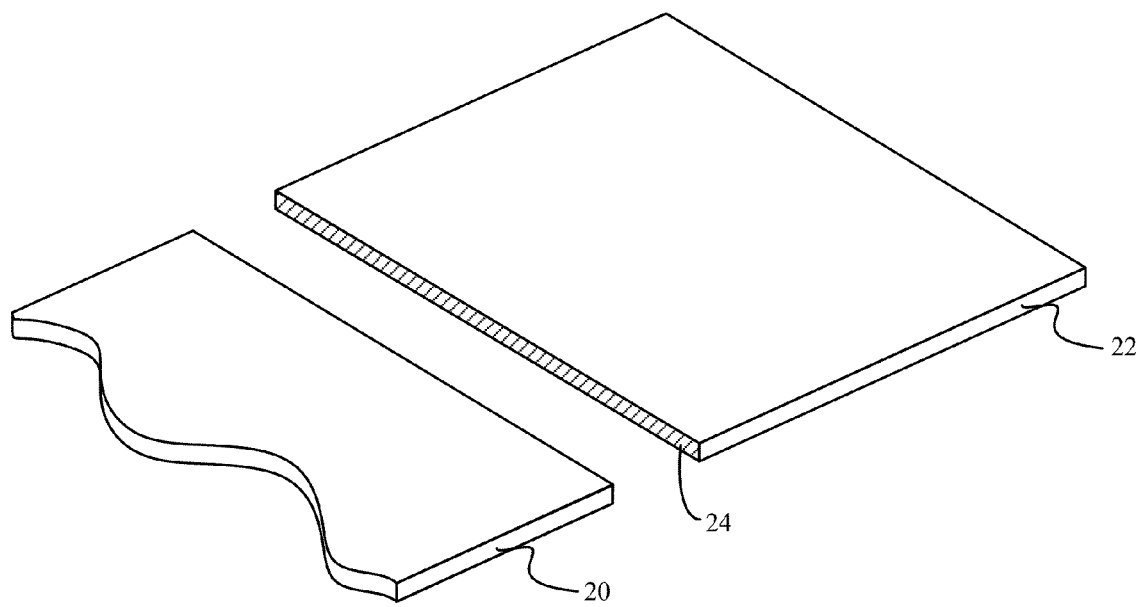
FIG. 2A is a simplified perspective view of an article that can be releasably attached to an electronic device via a side magnetic attachment system, in accordance with one described embodiment.
Figure 2B:
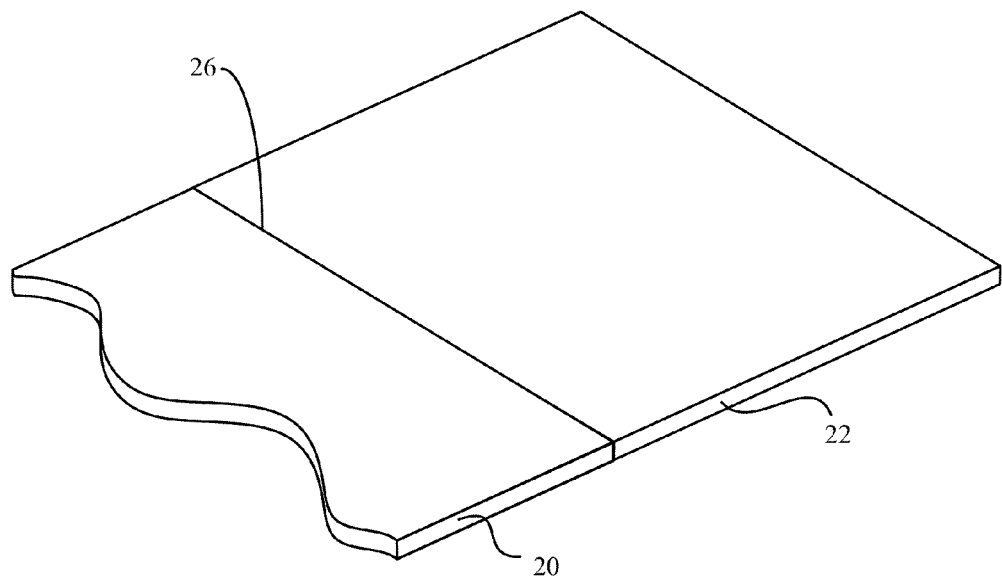
FIG. 2B shows the article and the electronic device of FIG. 2A attached in accordance with the side magnetic attachment system.

FIGS. 2A and 2B are simplified perspective views of article 20 that can be releasably attached to electronic device 22 via a magnetic attachment system, in accordance with one described embodiment. Article 20 and electronic device 22 can generally correspond to those discussed with regards to FIG. 1. In one embodiment, the magnetic attachment system can be embodied as magnetic surface 24 (shown by broken lines or shading) and more particularly as magnetic surface 24 at the sides of electronic device 22. Magnetic surface 24 can provide a magnetic field that can cooperate with a corresponding attachment feature in article 20 when placed in proximity to one another. The magnetic field can establish a net magnetic attractive force that can pull article 20 and electronic device 22 together into the mating engagement along engagement surface 26 as shown in FIG. 2B.

In other words, the magnetic field provided by magnetic surface 24 can have properties such that the net magnetic attractive force between article 20 and electronic device 22 is substantially perpendicular to engagement surface 26. Moreover, the magnetic field can result in the net magnetic attractive force between article 20 and electronic device 22 being applied uniformly along engagement surface 26. In order to release article 20 and electronic device 22, a releasing force can be applied to the two conjoined objects in order to overcome a net magnetic attractive force provided by the magnetic attachment system.

It also should be appreciated that although only one side wall is shown, in some cases different sidewalls and possibly a combination of sidewalls may be used depending on the needs of the attachment interface. It should be noted that the use of magnetic attachment precludes the need for mechanical attachments such as fasteners. Moreover, the lack of mechanical attachments and the uniformity of the overall magnetic attractive force can leave the surfaces of article 20 and electronic device 22 undisturbed helping to create an appearance of oneness by in which article 20 and electronic device 22 can appear as a single, unified entity. The uniformity in appearance can improve the overall aesthetic appeal of both article 20 and electronic device 22.

In one embodiment, a magnetic surface can be created by embedding magnetically attractable elements in the form of the magnetic attachment feature within the sidewalls of electronic device 22 and/or article 20. That is, the magnetically attractable elements can be disposed within article 20 and electronic device 22 as for example within the housing of electronic device 22. In this configuration, the housing can be formed of non-magnetic material such as plastic or non-ferrous metal such as aluminum. In this way, magnetic force lines can be configured to work through the walls of the housing. The magnetic attachment features do not disturb the physical appearance of the external surfaces of article 20 and electronic device 22. The magnetically attractable elements in article 20 and electronic device 22 can be arranged to produce magnetic fields that can cooperate with each other to generate a magnetic attractive force that attaches article 20 and electronic device 22 together in the mating engagement. The magnetic attractive force being configured to generate a magnetic attraction force normal to engagement surface 26 between electronic device 22 and article 20.

The magnetic attractive force between corresponding magnetic elements in article 20 and electronic device 22 can also be uniformly applied along engagement surface 26. The uniformity of the overall magnetic attractive force along engagement surface 26 can be a result of the uniformity of the separation distance between corresponding magnetic elements in article 20 and electronic device 22. The uniformity can also be a result of the consistency of magnetic flux density between corresponding magnetic elements in article 20 and electronic device 22. The uniformity of net magnetic attachment can be facilitated by the surfaces of article 20 and electronic device 22 each forming a well matched fit to each other. For example, one surface can be flat or have a concave geometry whereas the other surface can have a matching conforming convex geometry. In this way, by fitting tightly together, a separation distance between each of the corresponding magnetic elements in article 20 and electronic device 22 can be reduced to a minimum. The conformity of surface shapes can also enhance the overall look and feel of article 20 and electronic device 22 by reducing or eliminating the appearance of a seam at engagement surface 26. This seamless quality can provide an illusion of a single entity when article 20 and electronic device 22 are attached to each other.

In addition to enhancing the overall look and feel, the consistency of the separation distance between the magnetic elements can render the attachment force between article 20 and electronic device 22 uniform along engagement surface 26. In this way, the engagement force can be uniformly distributed across engagement surface 26 preventing buckling, weak spots, and so on that might otherwise affect the overall integrity of the engagement between article 20 and electronic device 22.

Figure 3A:
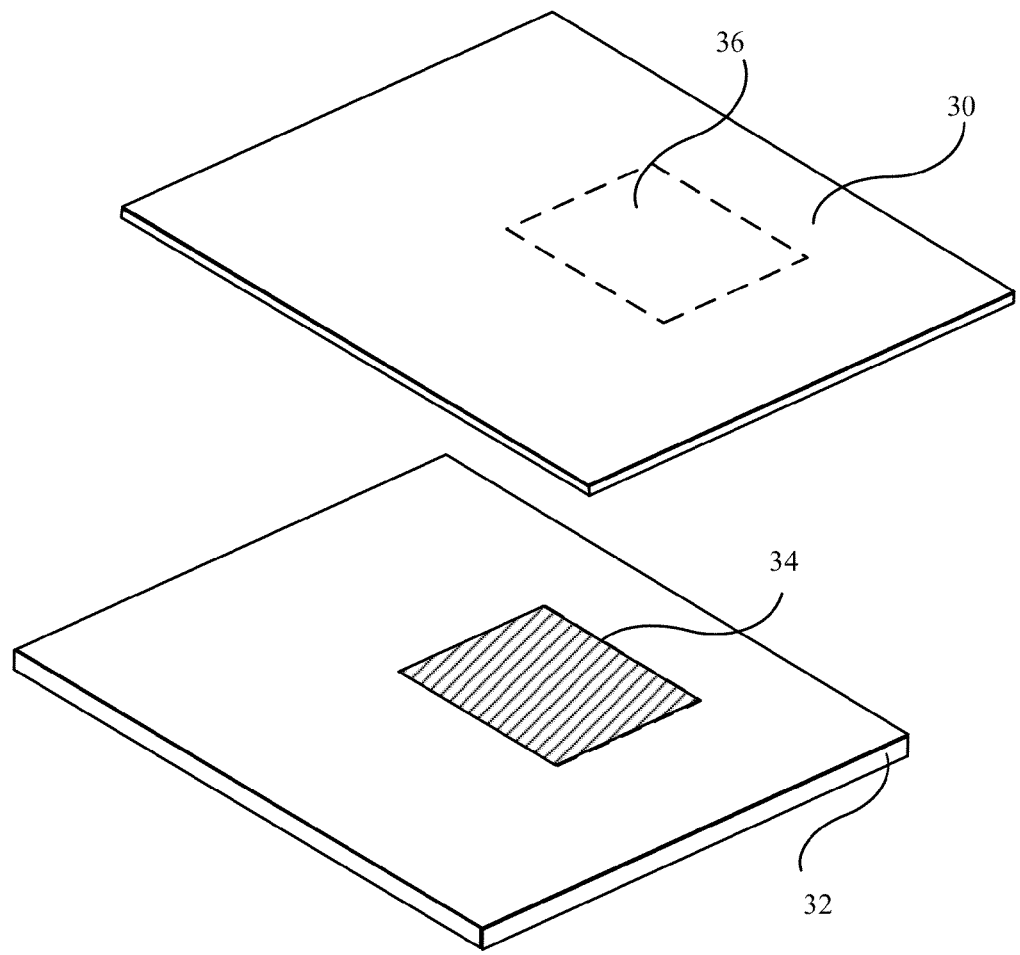
FIG. 3A is a simplified perspective view of an article that is releasably attachable to an electronic device via a top magnetic attachment system in accordance with one described embodiment.
Figure 3B:
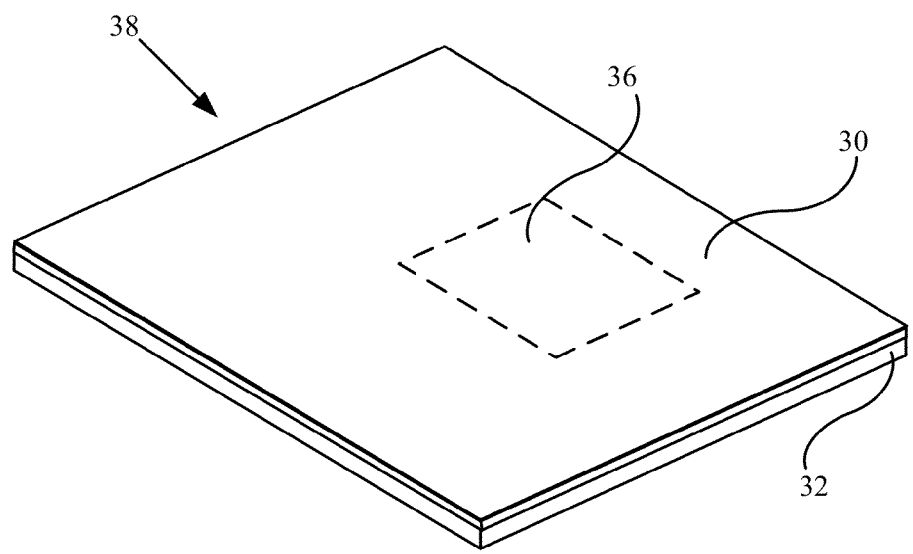
FIG. 3B shows the article and the electronic device of FIG. 3A magnetically attached to each to each other to form a cooperating system using the top magnetic attachment system.

FIGS. 3A and 3B are simplified perspective views of article 30 that can be releasably attached to an electronic device 32 via magnetic attachment system 34 and corresponding attachment system 36. It should be noted that this particular embodiment is similar to the embodiment described in FIGS. 2A, 2B except that the magnetic surfaces that were previously located at the side walls are now located on a face of electronic device 32 and, optionally, an opposing face on article 30. For example, in the case of an electronic device including a display, the magnetic elements of magnetic attachment system 34 can be embedded behind the display surface.

FIG. 3B shows article 30 and electronic device 32 magnetically attached to each to each other to form cooperating system 38. As part of system 38, electronic device 32 and article 30 can cooperate with each other to provide features not available by article 30 or electronic device 32 separately. For example, article 30 can take the form of a cover that can provide protective features. In one embodiment, protective cover can be used to support and protect electronic device 32 while being transported or stored (e.g., cover the display surface). Due to the releasable nature of the magnetic attachment between magnetic attachment systems 34 and 36, article 30 can be easily detached when electronic device 32 is to be used and subsequently re-attached when desired.

The placement of the magnetic elements can be such that only certain magnetically sensitive elements within electronic device 32 are affected by the magnetic field generated by the embedded magnetic elements. For example, a Hall Effect sensor can be used to detect whether or not article 30 is magnetically attached to and covering all or a portion of the display of electronic device 32 using the magnetic field generated by a magnetic element located in article 30. On the other hand, a magnetically sensitive element in electronic device 32 such as a compass that relies upon an external magnetic field (i.e., such as that provided by the Earth), must not be unduly affected by magnetic field lines generated by the embedded magnetic elements. Therefore, the magnetic elements can be limited to those locations in electronic device 32 positioned away from magnetically sensitive elements such as the compass.

FIGS. 4A and 4C are simplified perspective views of article 40 that can be releasably attached to electronic device 42 via a magnetic system 44. This embodiment is similar to that shown in FIGS. 2A, 2B and 3A, 3B in that magnetic system 44 can include multiple magnetically attractable elements and that article 40 and electronic device 42 generally correspond to those mentioned in previous Figures. For example, one set of magnetically attractable magnetic elements 44a can be placed relative to a side of article 40 and electronic device 42 while a second set of magnetically attractable elements 44b can be placed relative to a face of article 40 and electronic device 42. As shown in FIG. 4B, cooperating system 46 can be formed by placing article 40 and electronic device 42 within proximity to each other such that magnetic elements 44a on the sides of article 40 and electronic device 42 magnetically attract each other in addition to magnetic elements 44b located at the face of electronic device 42 and article 40. The overall magnetic attraction generated at the side and face can be sufficient to retain article 40 and electronic device 42 in a mating engagement to form cooperating system 46.

In one embodiment, as shown in FIG. 4C, cooperating system 46 is presented in an open configuration in which article 40 is used as a cover for electronic device 42 that can be opened and closed. That is, article 40 can act as a protective cover of electronic device 42. In this embodiment, article 40 can include binding 48 that attaches along the side of electronic device 42 and flap 50 that attaches to the front face of electronic device 42 and more particularly, top face 52. Top face 52 can correspond to a display. In one implementation, flap 50 can move relative to binding 48. The moving can be widely varied. In one example, flap 50 can pivot relative to binding 48. The pivot can be widely varied. In one example, the pivot can be enabled by a hinge mechanism. In another example, the pivot can be enabled by a fold. Furthermore, the flap can be rigid, semi-rigid or flexible. In this manner, article 40 can form an open configuration where flap 50 is positioned away from electronic device 42 (display 52 can be viewed) and a closed configuration where flap 50 is positioned adjacent electronic device 42 (display 52 is covered as represented by closed embodiment of FIG. 4B). In one embodiment, binding 48 is only located on one side while flap 50 is only located at top face 52. In so doing, the other surfaces of electronic device 42 are left exposed. As a result, the beauty of the electronic device may be shown off while the article is attached to the electronic device. Further, it may leave better access for I/O and connectivity related functionality (e.g., buttons, connectors, etc.).

Although the purpose of the magnetic elements is similar, i.e., attach article to electronic device, it should be appreciated that these mechanisms can widely vary. In some cases, the magnetic fields may be configured differently. By way of example, the side mounted magnetic surface may provide a first magnetic force and the front facing magnetic surface may provide a second magnetic force that is different than the first magnetic force. This may be in part due to different holding requirements as well as different surface areas, i.e., available space, and its effect on internal components of the electronic device. In one example, the side mounted magnetic surface provides a greater holding force for securing the article to the electronic device, i.e., it is the primary securing force while the front facing magnetic surface is the secondary securing force.

In one example, flap 50 includes multiple sections that are semi-rigid and bend relative to one another so as to make the flap movable and flexible. In one embodiment, flap 50 can be folded into one or more different configurations, and in some cases can be held in these configurations using a magnetic system similar to what is described above. These and other embodiments will be described in greater detail below. Moreover, it should be appreciated that the described embodiments are not limited to covers and that other configurations can be used including for example as an accessory device used as a hanging apparatus, as a support mechanism for the electronic device to improve viewing the display and as a support mechanism for or inputting touch events at a touch sensitive portion of the display, and so on.

Figure 5:
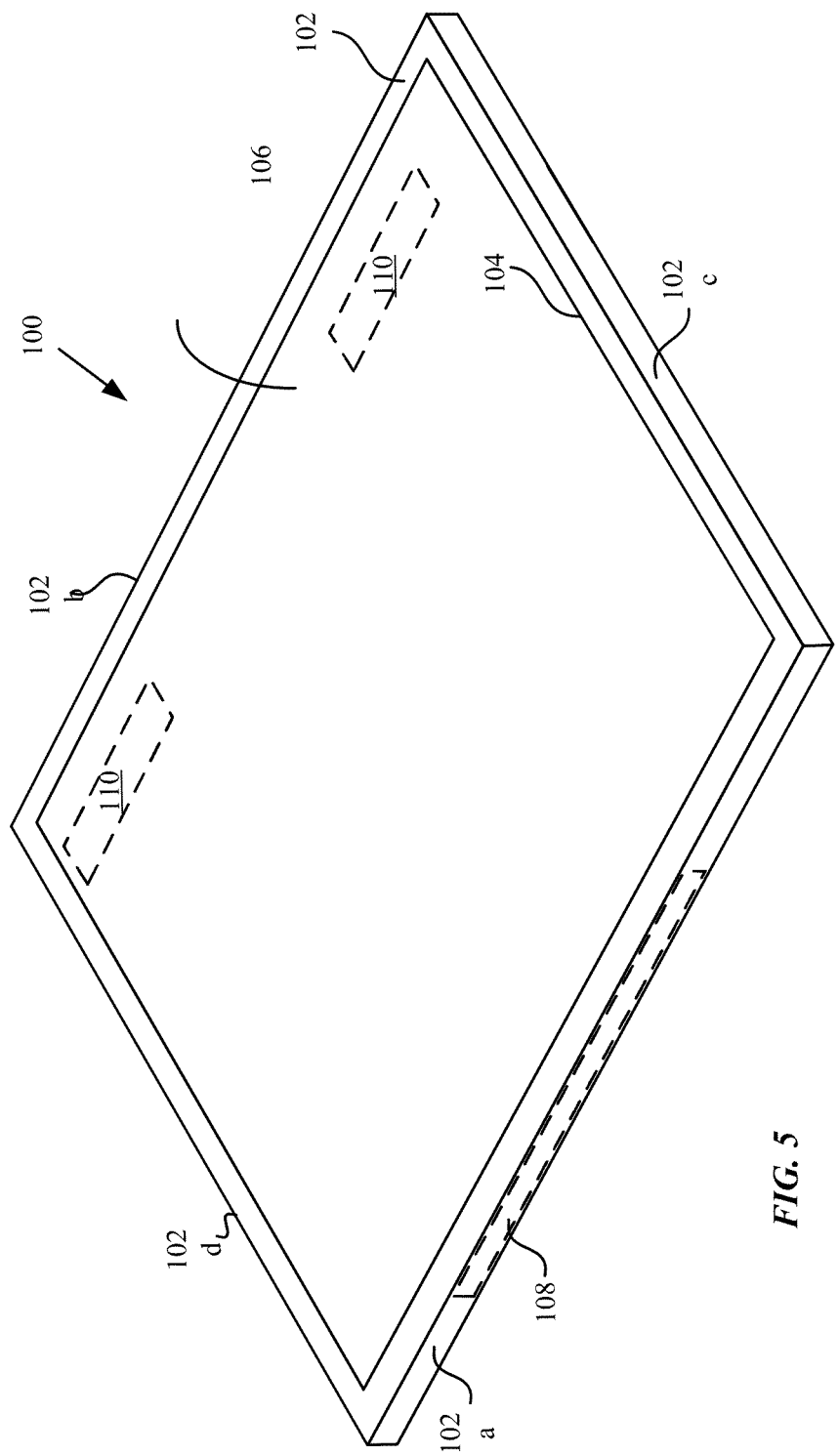
FIG. 5 shows a top perspective view of an electronic device in accordance with the described embodiments.

The electronic device and article can take many forms. For the remainder of this discussion, the electronic device is described in terms of a handheld portable computing device. Accordingly, FIG. 5 shows a top perspective view of electronic device 100 in accordance with the described embodiments. Electronic device 100 can process data and more particularly media data such as audio, visual, images, etc. By way of example, electronic device 100 can generally correspond to a device that can perform as a smart phone, a music player, a game player, a visual player, a personal digital assistant (PDA), a tablet device and the like. Electronic device 100 can also be hand held. With regards to being handheld, electronic device 100 can be held in one hand while being operated by the other hand (i.e., no reference surface such as a desktop is needed). Hence, electronic device 100 can be held in one hand while operational input commands can be provided by the other hand. The operational input commands can include operating a volume switch, a hold switch, or by providing inputs to a touch sensitive surface such as a touch sensitive display device or a touch pad.

Electronic device 100 can include housing 102. In some embodiments, housing 102 can take the form of a single piece housing formed of any number of materials such as plastic or non-magnetic metal which can be forged, molded, or otherwise formed into a desired shape. In those cases where electronic device 100 has a metal housing and incorporates radio frequency (RF) based functionality, a portion of housing 102 can include radio transparent materials such as ceramic, or plastic. Housing 102 can be configured to enclose a number of internal components. For example, housing 102 can enclose and support various structural and electrical components (including integrated circuit chips) to provide computing operations for electronic device 100. The integrated circuits can take the form of chips, chip sets, or modules any of which can be surface mounted to a printed circuit board, or PCB, or other support structure. For example, a main logic board (MLB) can have integrated circuits mounted thereon that can include at least a microprocessor, semi-conductor memory (such as FLASH), and various support circuits and so on. Housing 102 can include opening 104 for placing internal components and as necessary can be sized to accommodate display assembly for presenting visual content, the display assembly being covered and protected by protective layer 106. In some cases, the display assembly can be touch sensitive allowing tactile inputs that can be used to provide control signals to electronic device 100. In some cases, the display assembly may be a large prominent display area that covers a majority of the real estate on the front of the electronic device.

Electronic device 100 can include a magnetic attachment system that can be used to magnetically attach electronic device 100 to at least one other suitably configured object. The magnetic attachment system can include a number of magnetic attachment features distributed within and in some cases connected to housing 102. For example, the magnetic attachment system can include first magnetic attachment feature 108 and second magnetic attachment feature 110 located on different sides of electronic device 100. In particular, first magnetic attachment feature 108 can be located in proximity to side wall 102a of housing 102. Second magnetic attachment feature 110 can be located within opening 104 near side walls 102c and 102d proximate to side wall 102b of housing 102. By placing magnetic attachment feature 110 at opposite side walls, an amount of racking (or lateral movement) of a cover magnetically secured by attachment feature 110 can be substantially reduced. In those embodiments where electronic device 100 includes a display with cover glass 106 substantially filling opening 104, second attachment feature 110 (also referred to as securing attachment feature 110) can be placed beneath cover glass 106. It should be noted that without loss of generality, first magnetic attachment feature 108 will henceforth be referred to as device attachment feature 108.

Although not expressly shown, it is understood that the various magnetic attachment features of the magnetic attachment system can be located at any appropriate location of housing 102. For example, magnetic attachment features can be located at an interior bottom surface of housing 102 or along sides 102c and 102d of housing 102.

Figure 6:
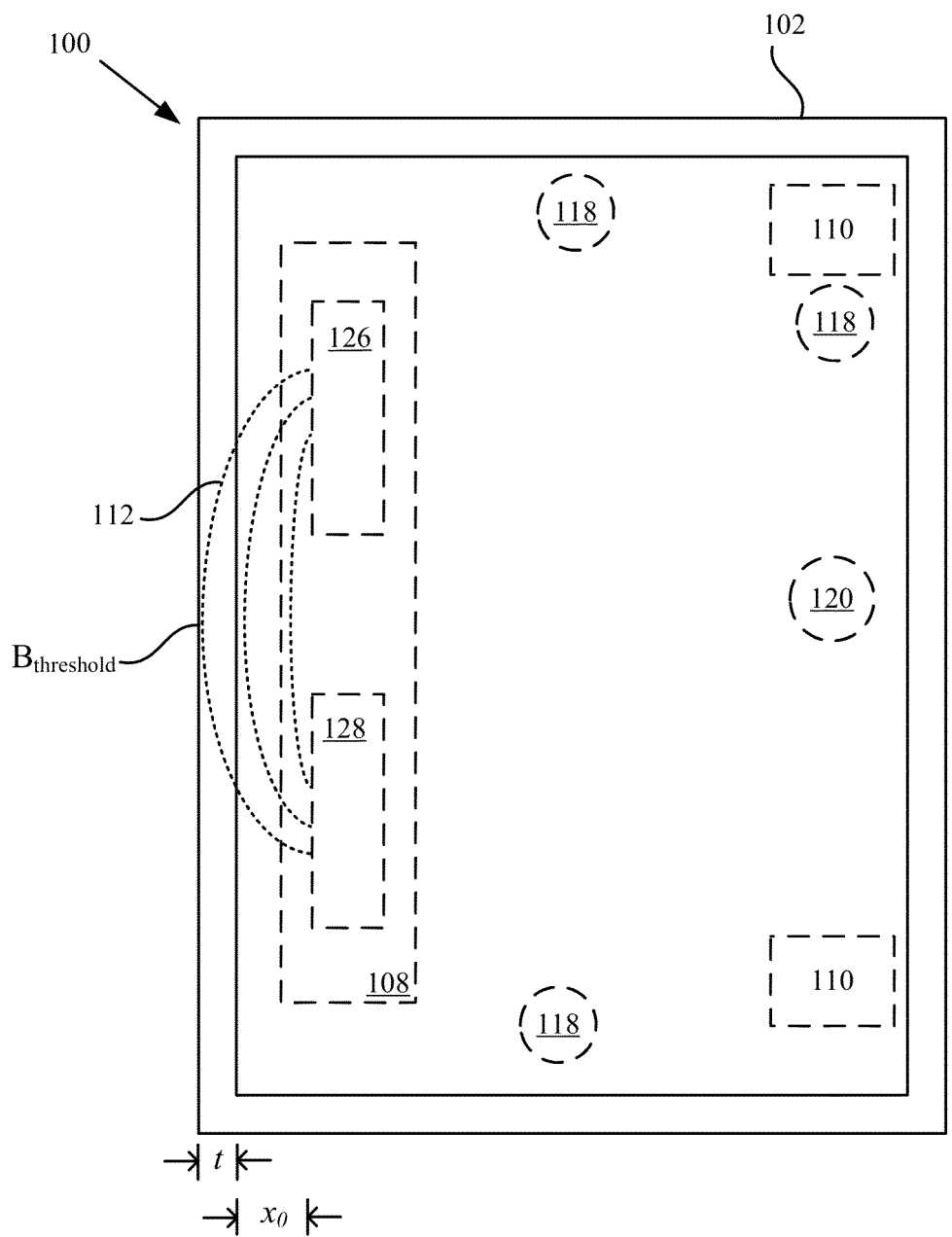
FIG. 6 shows another embodiment of a magnetic attachment feature.

As shown in FIG. 6, device attachment feature 108 and securing attachment feature 110 can each include one or more magnetic elements. In one example, device attachment feature 108 can multiple magnetic elements that can magnetically interact with each other to provide magnetic field 112 (only a portion of which is shown). In other words, the properties (shape, field strength, and so on) of magnetic field 112 can be based upon the interaction of the magnetic fields generated by each of the magnetic elements. In this way, the properties of magnetic field 112 can be altered simply by arranging the properties (i.e., physical layout, relative size, and constituent magnetic polarities) of each of the magnetic elements. For example, each of the magnetic elements can have varying sizes and can be disposed along an axis. In this way, the magnetic properties of each of the plurality of magnetic elements can act together to establish the overall properties of magnetic field 112.

In some cases, the portion of magnetic field 112 that is used in the magnetic attachment between device attachment feature 108 and another device can be enhanced with the use of a magnetic shunt (not shown). The magnetic shunt can be formed of magnetically active material, such as steel or iron, and be placed in a position that causes magnetic field lines that would otherwise be directed away from the attachment region to be at least partially re-directed towards the attachment region. The re-direction of the magnetic field lines can have the effect of increasing the average magnetic flux density in the attachment region.

Device attachment feature 108 can operate in an active state as in well as an inactive state. Magnetic flux density $B_{112}$ can equal or exceed a magnetic flux density threshold $B_{threshold}$ inside the exterior surface of housing 102 but not outside in the inactive state. In other words, magnetic flux density $B_{112}$ of magnetic field 112 at an exterior surface of housing 102 is less than a magnetic flux density threshold $B_{threshold}$. Magnetic flux density threshold $B_{threshold}$ representing a magnetic flux value below which magnetically sensitive devices (such a magnetic strip on a credit card) can remain substantially unaffected. In addition, the presence of a magnetically active material (such as steel) in the region outside of electronic device 100 will not by itself trigger device attachment feature 108 to transition from the inactive state to the active state.

The properties of magnetic field 112 can include at least field strength, magnetic polarity, and so on. The properties of magnetic field 112 can be based upon the combination of the magnetic fields from each of the magnetic elements included in magnetic attachment feature 108 The combined magnetic fields can form in the aggregate magnetic field 112. For example, the magnetic elements can be arranged in such a way that the combination of the respective magnetic fields results in magnetic field 112 having desirable magnetic field properties (such as field strength). For example, the combination of one arrangement of magnetic elements can result in magnetic field 112 having characteristics (such a polarity and strength) that are for the most part symmetric about a particular axis (such as a geometric center line).

On the other hand, the magnetic elements can be arranged in such a way that the combination of the magnetic fields of the magnetic elements can result in magnetic field 112 having at least one property that is anti-symmetric about the center line. For example, a magnetic element on one side of the centerline can be positioned with a North magnetic pole pointing up whereas a corresponding magnetic element on the other side of the centerline can be arranged with a South magnetic pole pointing up. Hence, the magnetic properties of magnetic field 112 can be adjusted in any manner deemed appropriate to provide a desired mating engagement. For example, the magnetic properties of magnetic field 112 can be modified by arranging the magnetic elements in such a way that magnetic field 112 can cooperatively interact with another magnetic field (from another magnetic attachment system, for example). The cooperative interaction between the two magnetic fields can result in the two objects being magnetically attached to each other in a well-defined, precise, and repeatable manner.

The properties of magnetic field 112 can be stable. By stable it is meant that the properties of the magnetic field can remain essentially unchanged for an extended period of time. Hence, a stable version of magnetic field 112 can be created using magnetic elements having properties that are essentially constant (or nearly constant) over an extended period of time or at least any changes in one component is offset by a corresponding change in another component. The magnetic elements can be physically arranged in a fixed or at least substantially fixed configuration with respect other magnetic elements. For example, the magnetic elements can each have fixed sizes and polarities arranged in a specific order relative to each other providing the desired properties (shape, strength, polarity, etc.) of magnetic field 112. Hence, depending upon the properties and the nature of the magnetic elements, the shape of magnetic field 112 can remain substantially unchanged over the extended period of time (such as the anticipated operating life of electronic device 100).

In some embodiments, however, the properties of magnetic field 112 can be varied by modifying a magnetic or other physical property of at least one of the magnetic elements. When at least one magnetic element has magnetic properties (e.g., a polarity or field strength) that can be modified, the resulting magnetic field can also be modified. Accordingly, in some embodiments at least one of the magnetic elements can be characterized as having dynamic magnetic properties. By dynamic it is meant that at least one magnetic property, such as polarity, can be modified. In this way, the magnetic field properties of the resulting magnetic field can also vary. The resulting magnetic field, in turn, can alter the magnetic characteristics of magnetic field 112 that, in turn, can alter how the magnetic attachment system causes the objects to magnetically attach to each other (alignment, orientation, centering, and so forth). An electromagnet is one example of such a magnetic element whose magnetic properties can be modified as desired. Other examples include a malleable non-magnetic substrate impregnated with magnetic dopant (such as magnetite). In this way, the malleable substrate can be formed into a physical shape that can affect the nature of the magnetic field produced by the magnetic dopant material.

Turning now to other aspects of the magnetic attachment system, securing attachment feature 110 can include one or more of magnetic elements 116. When a plurality of magnetic elements is used, the arrangement of the plurality of magnetic elements 116 can be widely varied and can magnetically interact with a cooperating feature on another device. In one embodiment, the plurality of magnetic elements 116 associated with securing feature 110 can assist in securing at least a portion of another device otherwise attached to electronic device 100 by way of device attachment feature 108.

At least some of the plurality of magnetic elements 116 can have a fixed size and polarity (along the lines of a simple bar magnet) whereas other of the plurality of magnetic elements 116 can have magnetic properties that can vary (such as an electromagnet) while still others can be shaped to provide specific magnetic characteristics. For example, at least one of the plurality of magnetic elements 116 can be positioned and shaped (if need be) to interact with a magnetically responsive circuit included in the other device. Hence, the magnetically responsive circuit can respond to the presence (or absence) of a particular magnetic element(s) of securing feature 110. An example of the magnetically responsive circuit is described above with regards to the Hall Effect sensor(s) 118.

It should be noted that the magnetic field generated by magnetic elements 116 should not extend so far that magnetically sensitive circuits within electronic device 100 (such as Hall Effect sensors 118) are adversely affected. This is particularly important since the magnetic field is not generally contained within housing 102 since at least a portion of the magnetic field must extend in the z direction in order to interact with the magnetically active portion of other devices. Therefore, the magnetic field in {x,y} must be limited in extent to avoid magnetically sensitive circuits such as Hall Effect sensor 118 and compass 120. In one embodiment, the shaping of the magnetic field in {x,y} can be accomplished using what can be referred to as shaping magnets discussed in more detail below. Moreover, some or all of magnets 116 can be shaped (such as a trapezoid) that contours magnetic field lines between each of the magnets 116 to restrict the extent in {x,y} to avoid unduly affecting sensitive magnetic circuits such as compass 120.

In a particular implementation, the magnetic elements of device attachment feature 108 can be grouped into distinct magnetic regions. In this way, the magnetic fields from the magnetic regions can superpose to form magnetic field 112. The magnetic regions can include various magnetic elements that can be arranged into groups represented by magnetic elements 126 and 128. By grouping the magnetic element into separate magnetic regions, the ability of the magnetic attachment system to provide a magnetic field having desired characteristics can be substantially enhanced. Magnetic elements 126 and 128 can interact with each other to form magnetic field 112. In the one embodiment, the interaction can take the form of combination of magnetic properties of each of magnetic elements 126 and 128. In some cases, the arrangement of magnetic elements 126 and 128 can be related to each other in order to provide magnetic field 112 with desired characteristics. For example, magnetic elements 126 can 128 can be arranged in such a way relative to one another that magnetic field 112 is anti-symmetric (or symmetric) about a horizontal center line of magnetic attachment feature 108. In another embodiment, magnetic field 112 can be anti-symmetric (or symmetric) about a vertical center line of attachment feature 108. In still another embodiment, magnetic field 112 can be anti-symmetric (or symmetric) both horizontally and vertically.

Figure 7A:
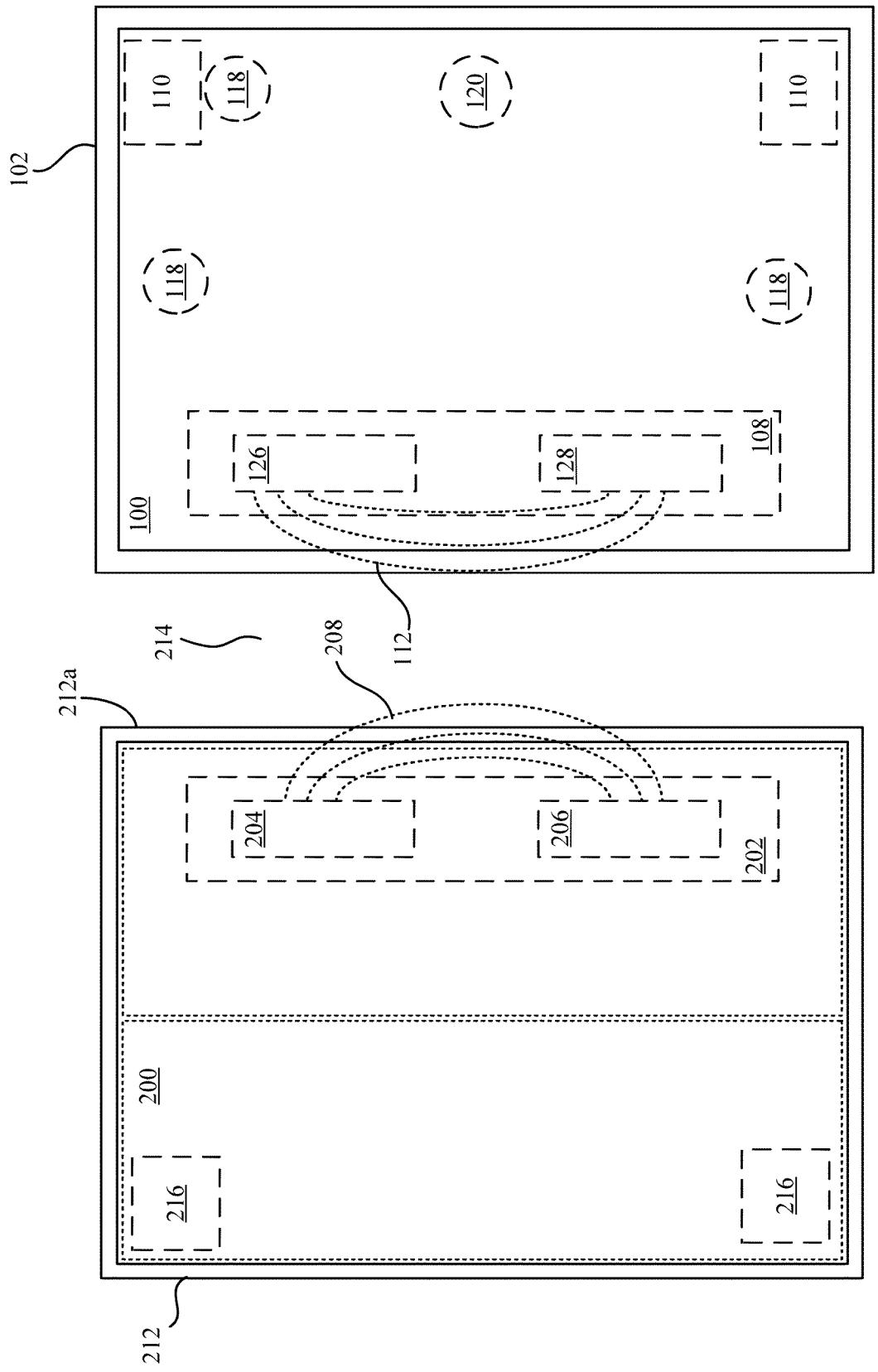
FIG. 7A shows an electronic device in proximity to another object in the form of an accessory device having a magnetic attachment feature.

FIG. 7A shows electronic device 100 in proximity to object 200 having magnetic attachment feature 202. Magnetic attachment feature 202 of object 200 can include magnetic elements each generating an individual magnetic field that can interact with the other to form in the aggregate a resulting magnetic field. The resulting magnetic field can have magnetic characteristics (such as field strength and shape) that can interact with magnetic field 112 of electronic device 100 to attach electronic device 100 and object 200 together in a well-defined, precise, and repeatable manner without mechanical fasteners and nor require external assistance. Object 200 can take many forms including an accessory, peripheral, electronic device or the like. In one embodiment, object 200 can take the form of an electronic device along the lines of electronic device 100. Accordingly, electronic device 100 and electronic device 200 can be magnetically attached to each other using device attachment feature 108 and magnetic attachment feature 202 to form a cooperative electronic system. The cooperative electronic system can be one in which electronic elements in electronic device 100 and corresponding electronic elements in electronic device 200 cooperate with the other to perform functions that cannot be performed by either of the electronic devices separately. In one embodiment, information can be passed between electronic devices 100 and 200.

More specifically, magnetic attachment feature 202 can include at least magnetic elements 204 and 206 each of which can generate magnetic fields that cooperate with each other to provide magnetic field 208 (only a portion of which is shown). The properties of magnetic field 208 can be based upon the interaction of each of the plurality of magnetic elements 204 and 206. In this way, magnetic field 208 can have properties based upon the physical layout, relative size, and constituent magnetic polarities of each of the plurality of magnetic elements 204 and 206. For example, magnetic elements 204 and 206 can be disposed along a center line and have magnetic properties that superpose to provide magnetic field 208 with desired properties.

In addition to magnetic attachment feature 202, accessory device 200 can further include magnetic attachment feature 216 that can be used to interact with securing attachment feature 110. Magnetic attachment feature 216 can include a variety of magnetically active components. Some of the magnetic elements can take the form of magnetic elements arranged to cooperatively interact with corresponding magnetic elements in securing attachment feature 110. Other of the magnetic element can be more passive in nature in that they provide a mechanism for completing a magnetic circuit with magnetically active elements in securing attachment feature 110. An example of a magnetically passive element is a ferromagnetic material, such as iron or steel, that can be interact with a magnetic element actively providing an associated magnetic field. In this way, the ferromagnetic material can interact with the magnetic field to complete a magnetic circuit between the passive element in attachment feature 216 and the active element in securing attachment feature 110.

Figure 7B:
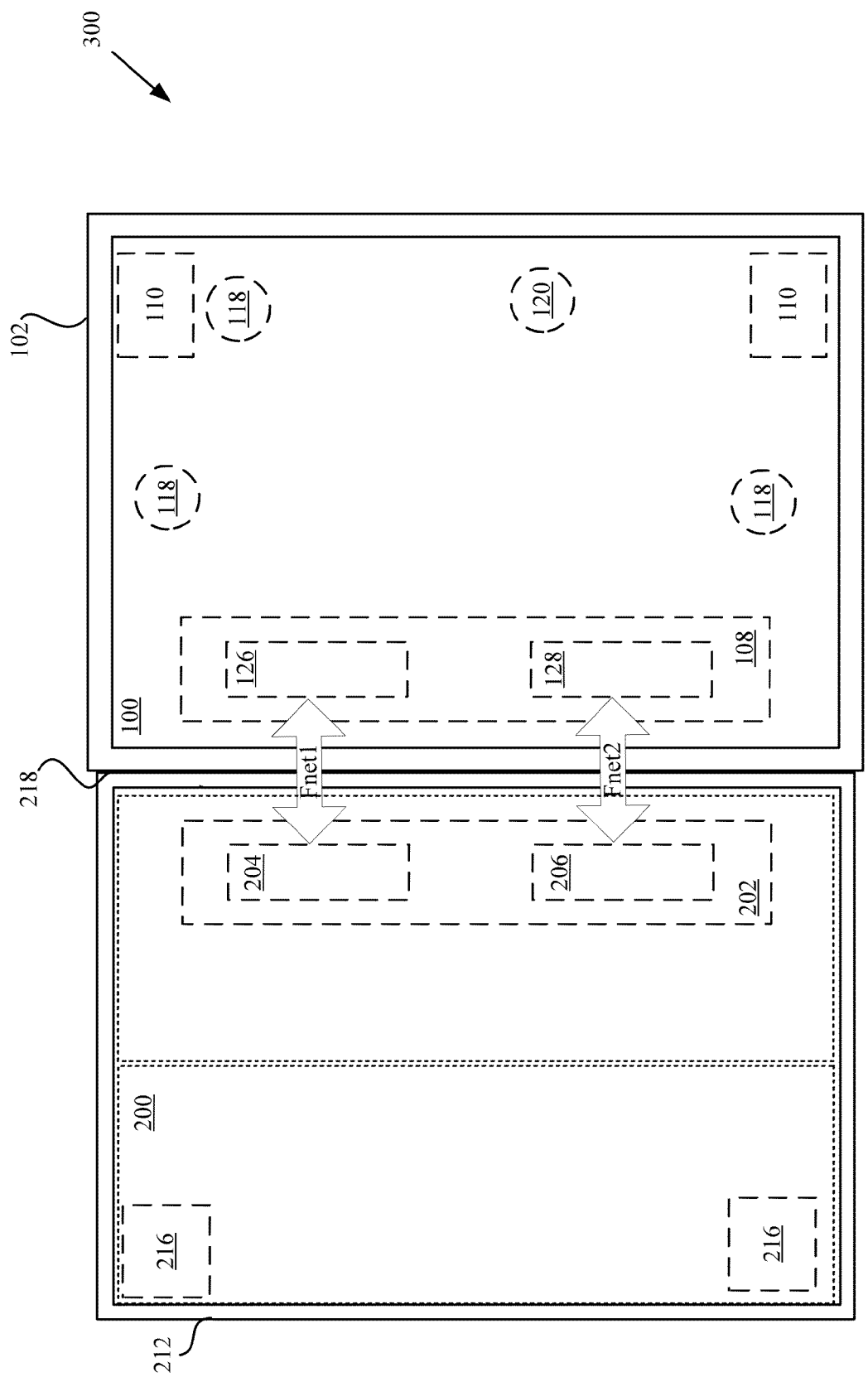
FIG. 7B shows a graphical representation of a cooperating system formed by the magnetic attachment of the accessory device and the electronic device as shown in FIG. 7A.

As shown in FIG. 7B, the overall magnetic attractive force $F_{NET}$ between device 100 and device 200 at engagement surface 218 can be derived as the summation of all the net magnetic attractive forces $F_{neti}$ for all actively coupled magnetic elements. In other words, the overall net magnetic attractive force $F_{NET}$ satisfies the following equation:

$$F_{NET} = \Sigma_1^n F_{neti}$$

where $F_{neti}$ is the net magnetic attractive force for each of n components. In one embodiment, net magnetic attractive force $F_{neti}$ is substantially perpendicular to that portion of engagement surface 218 intersected by magnetic field 112 and magnetic field 208.

In order to assure that overall magnetic attachment force $F_{NET}$ is uniform along the engagement surface between device 100 and device 200, the separation distances between each corresponding magnetic element in attachment features 108 and 202 are well controlled. The separation distance can be well controlled by, for example, shaping the magnetic elements to conform to the shape of the devices. For example, if device 100 has a spline (curved) shaped housing, the magnetic elements in device 100 can be shaped to conform to the curved shape. In addition, the magnetic elements can be formed in such a way that the magnetic vectors of corresponding magnetic elements align with each other. In this way, the magnitude and direction of the net magnetic attractive force can be controlled as desired.

One result of the aligning of the magnetic vectors is that the direction of the net magnetic force between each magnetic element can be well controlled. Moreover, by reducing the separation distance between corresponding magnetic elements to a minimum, the net attractive magnetic force $F_{neti}$ between each magnetic element can be maximized. In addition, maintaining a substantially uniform separation distance between the various magnetic elements, a correspondingly uniform magnetic attachment force can be provided along engagement surface 218. Moreover, by appropriately adjusting the corresponding magnetic vectors, $F_{net}$ can be applied normally to the engagement surface.

In addition to minimizing the separation distance between corresponding magnetic elements, the magnetic flux density between the corresponding magnetic elements can be increased by using magnetic shunts. A magnetic shunt formed of magnetically active material such as iron or steel can be placed on or near a magnetic element having the effect of directing magnetic flux lines in a desired direction. In this way, for example, magnetic flux lines that would otherwise propagate in a direction away from a corresponding magnetic element can be partially re-directed towards a desired direction, such as towards a magnetic attachment region between the devices thereby increasing the overall magnetic flux density. Hence, increasing the available magnetic flux density between the magnetic elements can result in a substantial increase in the net magnetic attractive force.

For the remainder of this discussion, various embodiments of accessory device 200 are discussed.

In one embodiment, accessory device 200 can include a number of protective elements that can be used to protect certain aspects of electronic device 100. For example, accessory device 200 can take the form of a protective cover. The protective cover can include a flap pivotally connected to a hinge assembly. The hinge assembly can, in turn, be coupled to electronic device 100 by way of accessory attachment feature 202. In this way, the flap portion can be used as a protective cover to protect aspects of electronic device 100 such as a display. The flap can be formed of various materials such as plastic, cloth, leather, and so forth. The flap can be segmented in such a way that a segment of the flap can be lifted to expose a corresponding portion of the display. The flap can also include a functional element that can cooperate with a corresponding functional element in electronic device 100. In this way, manipulating the flap can result in an alteration in the operation of electronic device 100.

The flap can include magnetic material that can be used to activate a magnetically sensitive circuit in electronic device 100 based upon, for example, the Hall Effect. The magnetically sensitive circuit can respond by generating a signal that can, in turn, be used to alter an operating state of electronic device 100. Since the cover can be easily attached directly to the housing of the tablet device without fasteners, the cover can essentially conform to the shape of electronic device 100. In this way, the cover will not detract or otherwise obscure the look and feel of electronic device 100.

Accessory device 200 can take the form of a support that can be used to enhance the functionality of electronic device 100. For example, accessory device 200 can be configured to act as a display stand on which a display of electronic device 100 can be viewed at a comfortable viewing angle such as 60°-85°. In other words, when placed upon a horizontal surface such as a table or desk, accessory device 200 can support electronic device 100 in such a way that the visual content presented at the display can be viewed at about a viewing angle of approximately 60°-85°. Accessory device 200 can also take the form of a support that can be used to enhance the functionality of electronic device 100 in a keyboard mode. In the keyboard mode, accessory device 200 can be used to present a touch pad surface at an angle that is ergonomically friendly. In this way, input touch events can be applied (to a virtual keyboard, for example) at an angle that does not overtax a user's wrist, hands, arms, etc.

Figure 8A:
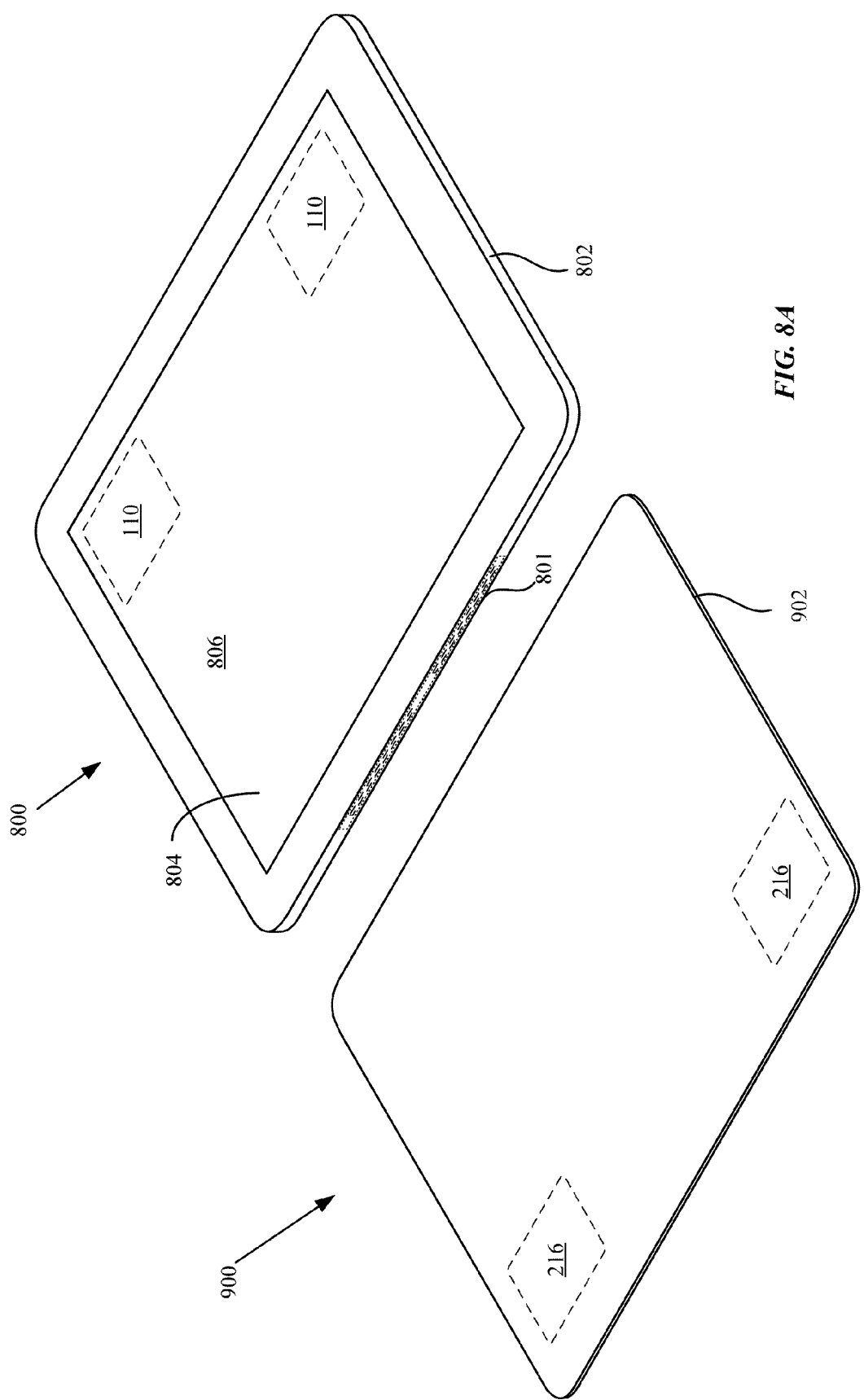
FIG. 8A shows a first perspective view of the electronic device in the form of a tablet device and the accessory device in the form of a protective cover.

The remainder of this discussion will describe particular embodiments of devices that can use the magnetic attachment system. In particular, FIG. 8A and FIG. 8B show electronic device 100 presented in terms of tablet device 800 and accessory device 200 is shown as cover assembly 900 each in perspective top views. These elements may generally correspond to any of those previously mentioned. In particular, FIGS. 8A and 8B shows two perspective views of tablet device 800 and cover assembly 900. For example, FIG. 8A shows magnetic surface 801 provided by device attachment feature 108 included in tablet device 800. In this configuration, magnetic surface 801 does not exhibit sufficient intensity to adversely affect sensitive magnetic components in the proximity of tablet device 800. Therefore, in this inactive mode, magnetic field 112 associated with magnetic surface 801 does not exceed $B_{threshold}$. FIG. 8B, on the other hand, is the view presented in FIG. 8A rotated about 180° to provide a second view of attachment feature 904 and its relationship with cover assembly 900.

As shown in FIG. 8A, tablet device 800 can include housing 802 that can enclose and support device attachment feature 108. In order to not interfere with the magnetic field generated by device attachment feature 108, at least that portion of housing 802 nearest device attachment feature 108 can be formed of any number of non-magnetic materials such as plastic or non-magnetic metal such as aluminum. Housing 802 can also enclose and support internally various structural and electrical components (including integrated circuit chips and other circuitry) to provide computing operations for tablet device 800. Housing 802 can include opening 804 for placing internal components and can be sized to accommodate a display assembly or system suitable for providing a user with at least visual content as for example via a display. In some cases, the display assembly can include touch sensitive capabilities providing the user with the ability to provide tactile inputs to tablet device 800 using touch inputs. The display assembly can be formed of a number of layers including a topmost layer taking the form of transparent cover glass 806 formed of polycarbonate or other appropriate plastic or highly polished glass.

Although not shown, the display assembly underlying cover glass 806 can be used to display images using any suitable display technology, such as LCD, LED, OLED, electronic or e-inks, and so on. The display assembly can be placed and secured within the cavity using a variety of mechanisms. In one embodiment, the display assembly is snapped into the cavity. It can be placed flush with the adjacent portion of the housing. In this way, the display can present visual content that can include video, still images, as well as icons such as graphical user interface (GUI) that can provide information the user (e.g., text, objects, graphics) as well as receive user provided inputs. In some cases, displayed icons can be moved by a user to a more convenient location on the display. In some embodiments, a display mask can be applied to, or incorporated within or under cover glass 806. The display mask can be used to accent an unmasked portion of the display used to present visual content and can be used to make less obvious device attachment feature 108 and securing attachment feature 110. Cover 900 can include flap 902 and (not shown) flexible hinge 904 that can magnetically interact with magnetic attachment feature 108 to form a magnetic attachment force suitable for magnetically attaching cover 900 and tablet device 800. FIG. 8B shows tablet device 800 and cover 900 rotated in such a way to show more clearly flexible hinge assembly 904.

Figure 9A:
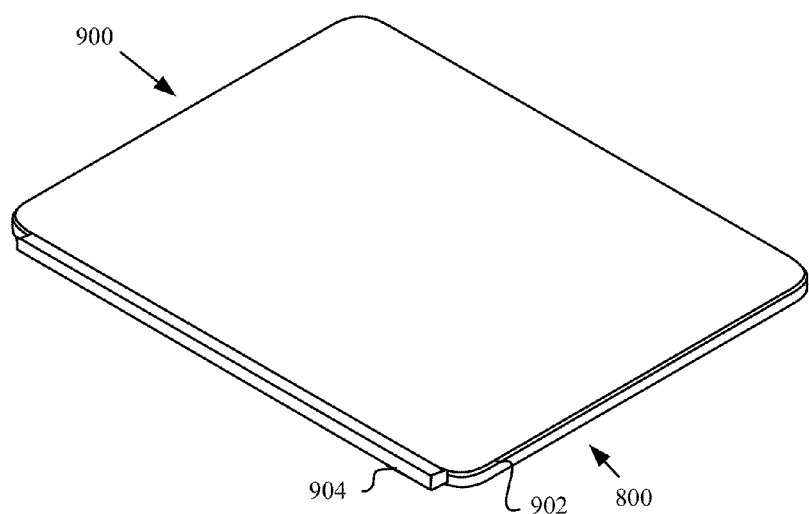
FIG. 9A shows a closed configuration of the cooperating system formed by the tablet device and protective cover shown in FIGS. 8A and 8B.
Figure 9B:
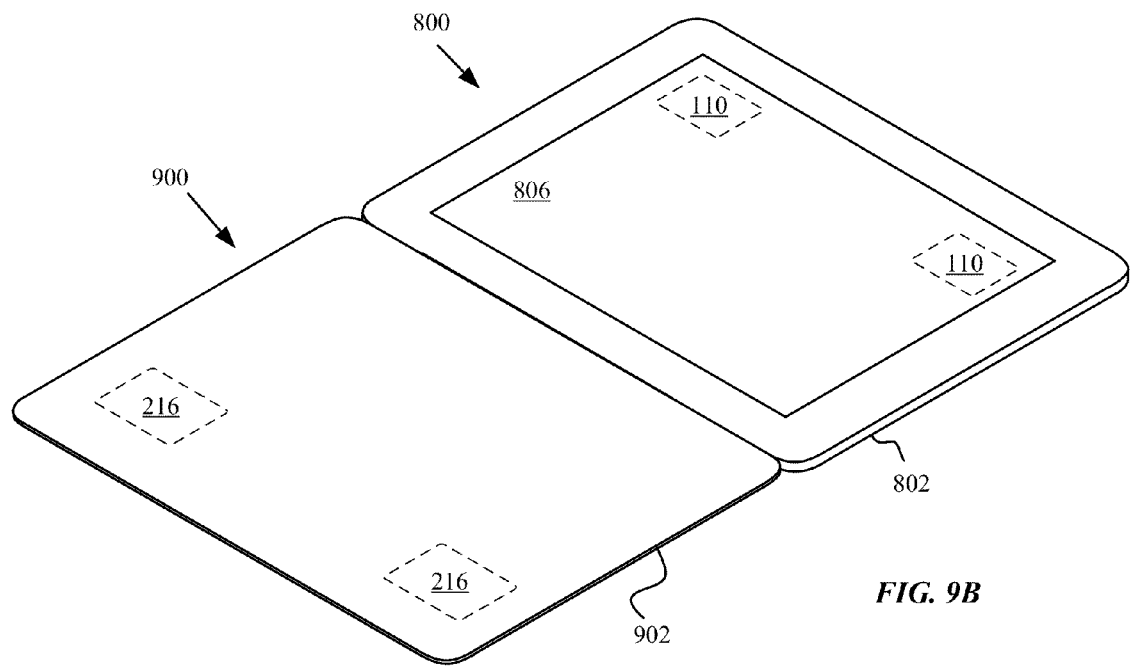
FIG. 9B shows an open configuration of the cooperating system shown in FIG. 9A.

Cover assembly 900 is shown in FIGS. 9A and 9B attached to tablet device 800. FIG. 9A shows cover assembly 900 attached to tablet device 800 in a fully closed configuration in which flap 902 fully covers cover glass 806 and the corresponding portion of the display assembly. On the other hand, FIG. 9B shows cover assembly 900 attached to tablet device 800 in an open configuration in which cover glass 806 is fully viewable. In one embodiment, flap 902 can have a size and shape in accordance with a top portion of tablet device 800 such as cover glass 806. Flap 902 can be pivotally connected to flexible hinge assembly 904. Flexible hinge assembly 904 can include magnetic attachment feature 202 in the form of an array of magnets arranged to magnetically interact with magnetic field 112 provided by magnetic attachment feature 108. The magnetic attachment force between flexible hinge assembly 904 and attachment feature 108 can maintain cover assembly 900 and tablet device 800 in a proper orientation and placement vis-a-vis flap 902 and cover glass 806. By proper orientation it is meant that cover assembly 900 can only properly attach to tablet device 800 having flap 902 and cover glass 806 aligned in a mating engagement. The mating arrangement between cover glass 806 and flap 902 is such that flap 902 covers substantially all of cover glass 806 when flap 902 is placed in contact with cover glass 806.

In order to transition from the closed to the open configuration, releasing force $F_{release}$ can be applied to flap 902. Releasing force $F_{release}$ can overcome the magnetic attractive force between attachment feature 216 in flap 902 and attachment feature 110 in tablet device 800. Hence, cover assembly 900 can be secured to tablet device 800 until releasing force $F_{release}$ is applied to flap 902. In this way, flap 902 can be used to protect cover glass 806. For example, cover assembly 900 can be magnetically attached to tablet device 900. Flap 902 can then be placed upon and magnetically secured to cover glass 806 by the magnetic interaction between magnetic attachment features 110 and 216. Flap 902 can be detached from cover glass 806 by the application of releasing force $F_{release}$ directly to flap 902. Releasing force $F_{release}$ can overcome the magnetic attraction between magnetic attachment features 110 and 216. Hence, flap 902 can then move away from cover glass 806 unhindered. In order to maintain a good magnetic attachment between flap 902 and magnetic attachment feature 110, flap 902 can include a number of magnetic elements. Some of the magnetic elements in flap 902 can interact with corresponding magnetic elements in magnetic attachment feature 110. The net magnetic attractive force generated between the magnetic elements can be strong enough to prevent inadvertent release of flap 902 from cover glass 806 during normal handling. The net magnetic attractive force, however, can be overcome by releasing force $F_{release}$. It should be noted that using at least two magnetic attachment features 110 on either side of tablet device 800, lateral movement of cover 900 (also referred to as racking) can be essentially eliminated.

Figure 10A:
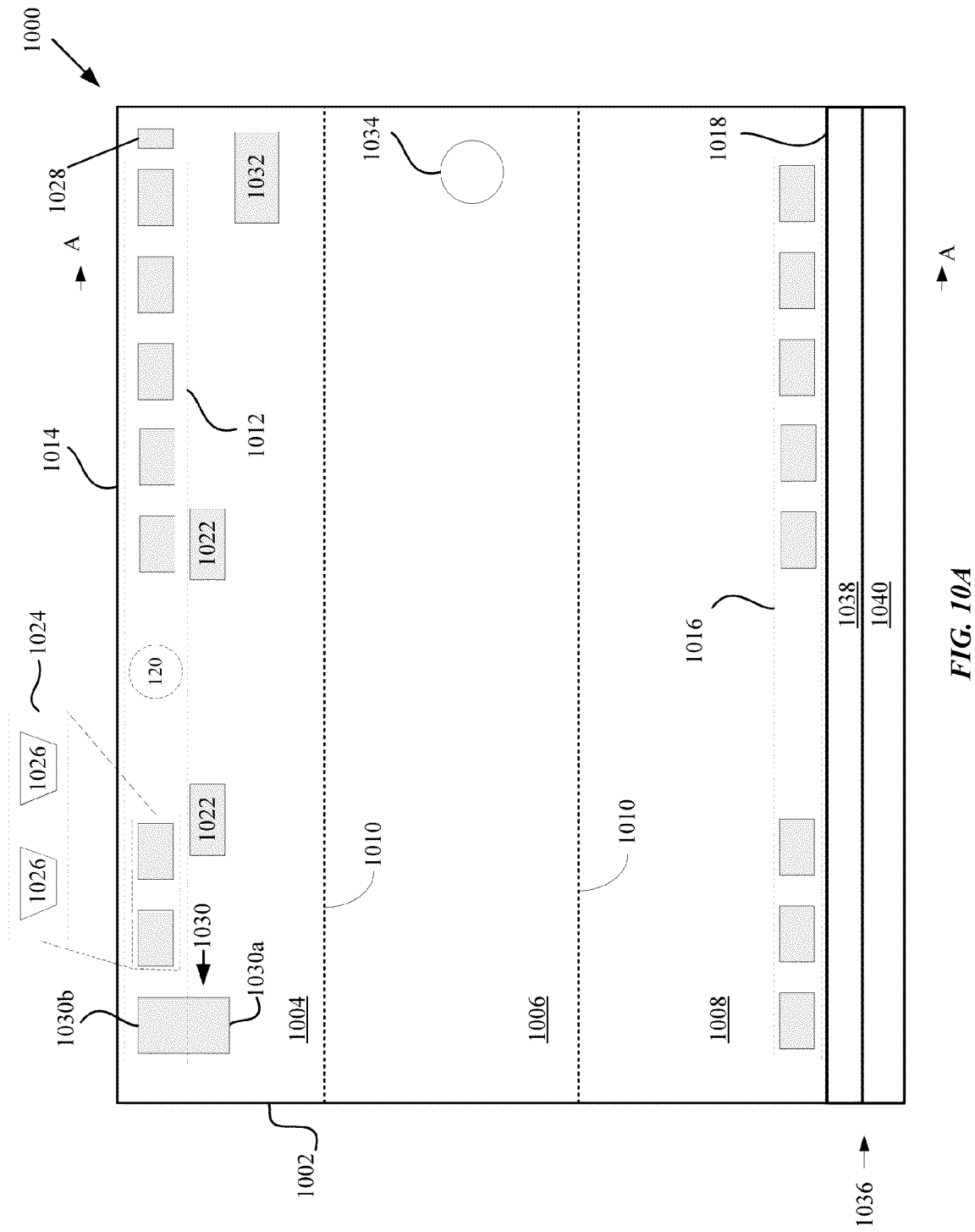
FIG. 10A shows a top view of an embodiment of a segmented cover assembly.

In some embodiments, flap 902 can be unitary in appearance by which it is meant that flap 902 can appear as a single unit such that flap 902 can bend slightly if formed of flexible material. However, in other cases, flap 902 can include a number of segments joined to adjacent segments by associated folding regions that permit the segments to fold independently of each other as well as with respect to tablet device 800. Accordingly, FIG. 10A shows a top view of a specific embodiment of cover assembly 900 in the form of cover assembly 1000. Cover assembly 1000 can include body 1002. Body 1002 can have a size and shape in accordance with cover glass 806. Body 1002 can be formed from a single piece of foldable or pliable material. Body 1002 can also be divided into segments separated from each other by a folding region. In this way, the segments can be folded with respect to each other at the folding regions.

In one embodiment, body 1002 can be formed of layers of material attached to one another forming a laminate structure. Each layer can take the form of a single piece of material that can have a size and shape in conformance with body 1002. Each layer can also have a size and shape that correspond to only a portion of body 1002. For example, a layer of rigid or semi-rigid material about the same size and shape of a segment can be attached to or otherwise associated with the segment. In another example, a layer of rigid or semi-rigid material having a size and shape in accordance with body 1002 can be used to provide segmented cover assembly 1000 as a whole with a resilient foundation. It should be noted that the layers can each be formed of materials having desired properties. For example, a layer of segmented cover assembly 1000 that comes in contact with delicate surfaces such as glass can be formed of a soft material that will mar or otherwise damage the delicate surface. In another embodiment, a material such as micro-fiber can be used that can passively clean the delicate surface. On the other hand, a layer that is exposed to the external environment can be formed of a more rugged and durable material such as plastic or leather.

In a specific embodiment, body 1002 can be partitioned into a number of segments that can be widely varied. In the embodiment shown in FIG. 10A, segmented body 1002 can be partitioned into three segments, segments 1004, 1006, and 1008 each coupled to an adjacent segment by thinner, foldable portions 1010. Each of the segments 1004-1008 can include one or more inserts disposed therein. By way of example, the segments can include a pocket region where the inserts are placed or alternatively the inserts may be embedded within the segments (e.g., insert molding). If pockets used, the pocket region can have a size and shape to accommodate corresponding inserts. The inserts can have various shapes but are most typically shaped to conform to the overall look of segmented body 1002 (e.g., rectangular). The inserts can be used to provide structural support for segmented body 1002. That is, the inserts can provide stiffness to the cover assembly. In some cases, the inserts may be referred to as stiffeners. As such, cover assembly 1000 is relatively stiff except along the foldable regions that are thinner and do not include the inserts (e.g., allows folding) making segmented cover assembly 1000 more robust and easier to handle. In one embodiment segments 1004, 1006, and 1008 can have a size relationship to each other such that a segments 1004-1008 can be used to form a triangular support structure. The triangular support structure can be used to enhance a user experience of tablet device 800.

For example, if segmented body 1002 is constructed to have three independently foldable segments (segment 1004, segment 1006, and segment 1008), a triangular structure can be formed by coupling segment 1004 and segment 1008 (using magnets as described below or simply friction coupling). It should be noted that the properties of the triangular structure can vary in accordance with the relative sizes of the segments 1004, 1006, and 1008. In other words, when segments 1004, 1006, and 1008 are about equal in width, then the triangular structure can take the form of an equilateral triangle, whereas when two segments are about of equal width, then the triangular structure can take on the shape of an isosceles triangle. In this way, the triangular structure can be shaped for a particular purpose. For example, in one configuration the triangular structure can be used to support tablet device 800 in a movie mode or in a keyboard mode.

In one embodiment, segmented body 1002 can include a number of magnets some of which can be used to form the triangular structure. For example, segment 1004 can include first edge attach magnets 1012 linearly arrayed along first edge 1014 of segmented body 1002 whereas segment 1008 can include second edge attach magnets 1016 linearly arrayed along second edge 1018 opposite to first edge 1014. In this embodiment, first edge attach magnets 1012 and second edge attach magnets 1016 have a one to one correspondence in which each first edge attach magnet 1012 can be associated with a corresponding one of second edge attach magnets 1016. Moreover, in order to create a maximum magnetic attractive force between first edge attach magnets 1012 and second edge attach magnets 1016, each magnet pair can exhibit opposite magnetic polarities. For example, when first edge attach magnets 1012 are arranged in first polarity pattern (alternating) $M_1\{P1, P2, P1, P2, P1, P2, P1, P2\}$, then second edge attach magnets 1016 can be arranged in complementary priority pattern $M_2\{P2, P1, P2, P1, P2, P1, P2, P1\}$. In this way, a maximum magnetic attachment force can be realized between the two magnetic arrays while minimizing magnetic fringe effects at the ends of the magnetic arrays. In one embodiment, first edge attach magnets 1012 and second edge attach magnets 1016 can have dimensions of approximately (L×W×H) of 10 mm×5 mm×8 mm formed of neodymium (N35SH) grade magnets. It should be noted that the number of edge attach magnets can vary from as few as two to more than 16.

It should be noted that in some cases, it can be desirable to constrain a magnetic field provided by first edge attach magnets 1012 and second edge attach magnets 1014 in order to avoid or at least control adverse magnetic affects on sensitive magnetic circuits such as compass 120 (whose position is indicated in relation to first edge attach magnets 1012 when segmented body 1002 is in the fully closed configuration). In order to control the adverse affects of the magnetic field generated by first edge attach magnets 1012, field shaping magnets 1022 can be placed in positions that can reduce a magnetic offset experienced by compass 120. Moreover, as shown in insert 1024, first edge attach magnets 1012 (as well as second edge attach magnets 1016) can be shaped in such a way that leakage magnetic flux $\Phi_{leakage}$ between the constituent magnets can be substantially reduced. In the embodiment shown in insert 1024, magnets 1026 are trapezoidal in form that limits the amount of magnetic flux $\Phi_{leakage}$. In this way, the magnetic offset at compass 120 caused by first edge attach magnets 1012 can be maintained with an acceptable range. For example, the magnetic offset at compass 120 from edge attach magnets 1012 can be on the order of 10° or less at a reference location.

One approach to forming at least one triangular support structure can be to simply friction couple segment 1004 and segment 1008. By friction couple it is meant that surface friction created between segments 1004 and 1008 when brought in direct contact can be sufficient to maintain the triangular structure even when used to support tablet device 800 in the movie mode or the keyboard mode. Alternatively, the triangular structure can be formed by bringing first edge attach magnets 1012 in proximity to second edge attach magnets 1016 thereby forming a magnetic circuit. It should be noted that in some embodiments, first edge attach magnets 1012 and second edge attach magnets 1016 are not required to overlay one another but merely be in proximity separated by distance "d" (shown in FIG. 11) from one another to create the magnetic circuit. Therefore, by creating the magnetic circuit configured to maintain the integrity of the triangular structure, the triangular structure can be used for multiple purposes to enhance the functionality of tablet device 800.

Segmented cover 1000 can also include holding magnets 1028 and 1030 that can be used to maintain segmented cover 1000 in a fixed position in relation to display 806 in the fully closed configuration. In other words, holding magnets 1028 and 1030 can reduce or even eliminate movement of cover 1000 from "side to side" (sometimes referred to as "racking"). In one embodiment, holding magnet 1030 can be over-sized in relation to holding magnet 1028. In this way, first portion 1030a of holding magnet 1030 (i.e., that portion of holding magnet 1030 that does not function as an edge attach magnet) can cooperate with holding magnet 1028 to reduce racking of cover 1000 whereas edge attach portion 1030b of holding magnet 1030 can function as part of first edge attach magnets 1012.

In some cases, cover 1000 can also include magnets used to trigger magnetic sensors in tablet device 900. For example, segment 1004 can include first sensor magnet 1032 and segment 1006 can include second sensor magnet 1034. It should be noted that in some embodiments, first sensor magnet 1032 can be over-sized to prevent a false open condition in which tablet device 800 activates the display assembly even though body 1002 remains in the fully closed configuration. The false open condition can be triggered when body 1002 laterally moves (i.e., racking) to such an extent that a sensor disposed in tablet 800 can no longer detect the magnetic field generated by first sensor magnet 1032 causing the processor in tablet device 1032 to alter the operating state to active display mode. Therefore, the combination of oversizing of first sensor magnet 1032 and using holding magnets 1028 and 1030 to reduce racking, the incidence of false open condition can be greatly reduced.

In this arrangement, first sensor magnet 1032 can be detectable by a magnetically sensitive circuit (such as a Hall Effect sensor, or HFX) disposed within tablet 800. In particular, the HFX can detect a magnetic field provided by sensor magnets 1032 and 1034 through protective layer 806. In this way, a processor in tablet device 800 can use magnetic detection information to determine a spatial relationship between cover 1000 and tablet 800. More specifically, the detection information can provide an indication that segment 1004 is folded away from tablet 1000 (when sensor magnet 1032 is not detected and sensor magnet 1034 is detected). In this way, the processor can alter operation of tablet device 800 in accordance with the spatial relationship between cover 1000 and tablet 800. For example, when the processor determines that only segment 1004 is folded away to reveal a corresponding portion of display assembly 804, then the processor can change the operation of tablet 800 to provide visual content only by the revealed portion of display assembly 804 in what is referred to as peek mode. In some embodiments, tablet device 800 can operate in what is referred to as extended peek mode when sensor magnets 1032 and 1034 are not detected but the processor can determine that cover 1000 is magnetically attached to tablet 800 (in other words, segments 1004 and 1006 are folded away from tablet device 800 to reveal a corresponding portion of display assembly 804, but segment 1008 remains in place). In this way, tablet device 800 can present visual content in only that portion of display assembly 804 that is viewable (corresponding to folded away segments 1004 and 1006).

Cover 1000 can magnetically attach to tablet device 800 using flexible hinge assembly 1036 that can include flexible hinge 1038 and magnetic assembly 1040. Flexible hinge assembly 1036 can be integrated in the sense that there flexible hinge assembly 1036 is formed as part of segmented cover 1000. In some embodiments, flexible hinge assembly 1036 can be formed of the same material (fabric, leather, etc.) as is used to form a top portion of segmented cover 1000. In this way, the visual effect can be one of continuity when viewing segmented cover 1000. Further enhancing the sense of continuity is the wrap around nature of flexible hinge 1036. By wrap around it is meant that material that forms body 1002 (and in particular a top portion formed of fabric, for example) can continue beyond edge 1018 (sometimes referred to as a tail) to form flexible hinge 1038 that can wrap around magnetic assembly 1040. In this way, a sense of continuity between body 1002 and flexible hinge assembly 1036 can be achieved.

Figure 10B:
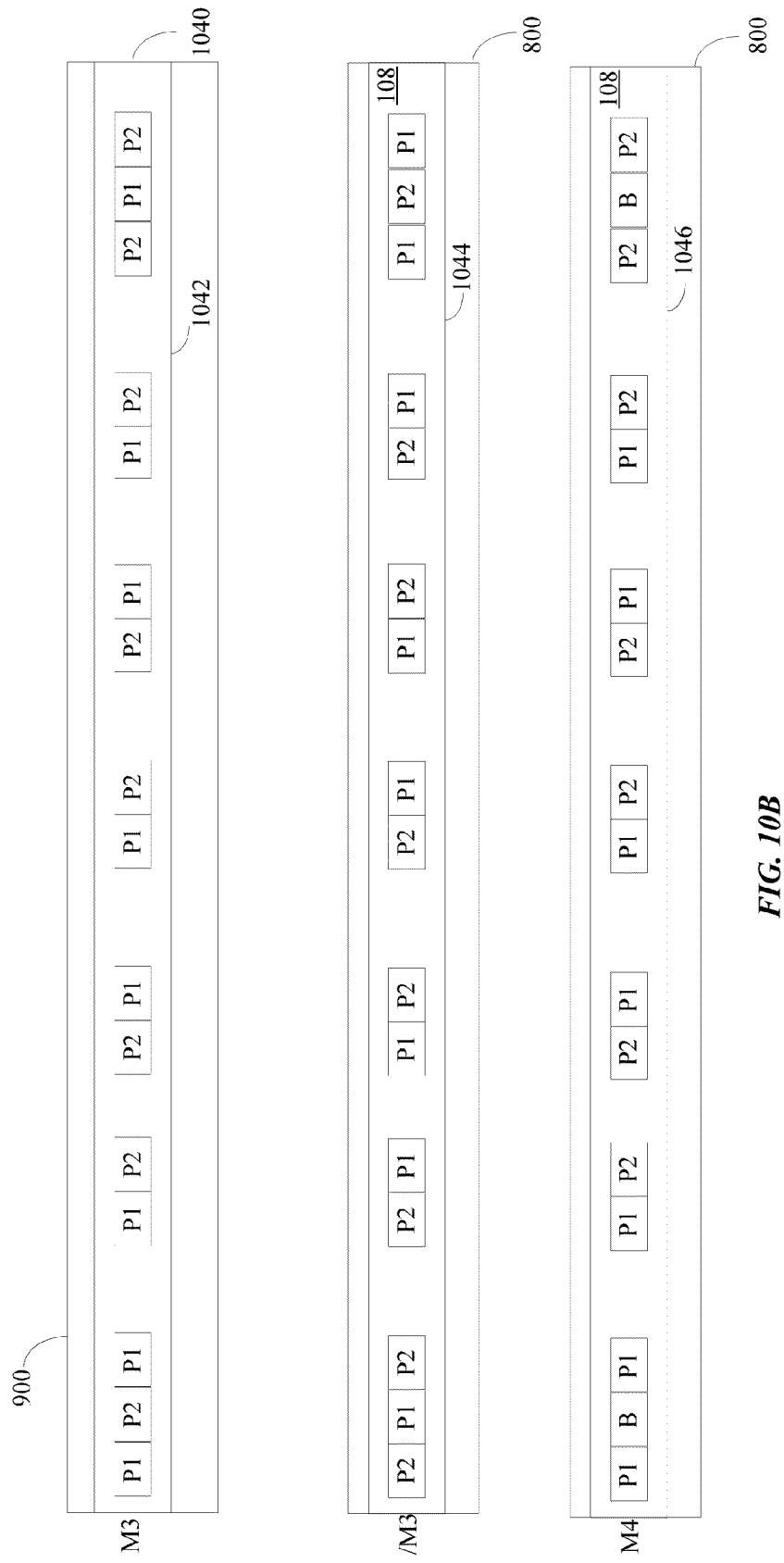
FIG. 10B shows a representative magnetic assembly.

Flexible hinge assembly 1036 can include flexible hinge 1038 coupled to magnetic assembly 1040 configured to magnetically attach to magnetic attachment feature 108 in tablet device 800. In one embodiment, magnetic assembly 1040 can include a plurality of magnets configured to form a magnetic attachment with corresponding magnets in magnetic attachment feature 108. For example, FIG. 10B shows a representation of possible magnet arrays used to magnetically attach cover 1000 and tablet device 800. In one embodiment, magnetic assembly 1040 can include magnetic array 1042 arranged in alternating pattern M3 as follows:

M3: {[P1, P2, P1], [P1, P2],[P2, P1], [P1,P2],[P2,P1,[P1, P2][P2,P1,P2]}

(where brackets [ ] indicate physically grouped magnets).

On the other hand, magnetic attachment feature 108 disposed in tablet device 800 can include a corresponding magnetic array 1044 arranged in a manner that is complementary to alternative pattern M3. By complementary it is meant that magnetic polarities are inverted in that a magnet having a P1 polarity will be paired with a magnet having a P2 polarity and so forth. In this way, a maximum amount of magnetic attractive force between the two magnets can be realized with a minimum of magnetic fringing effects at either end of the magnetic array.

However, in still other embodiments as represented by magnetic array 1046, specific magnets can be replaced by ferromagnetic blocks in order to conserve on the number of magnets used for magnetic attachment. For example, in one embodiment, a reduced number of magnets can be used in magnetic attachment feature 108 by replacing some magnets with ferromagnetic blocks (B) and can be arranged in polarity pattern M4 as follows:

M4: {[P1, B, P1], [P1, P2],[P2, P1], [P1,P2],[P2,P1,[P1, P2][P2,B,P2]} where B represents a ferromagnetic block formed of ferromagnetic material such as 1010 steel. It should be noted that the arrangement of magnets in either magnetic attachment feature 108 or magnetic assembly 1040 can be widely varied. Any limitations can be due primarily to the relationship between the magnetic arrays and the desired properties of the magnetic attachment.

Figure 11:
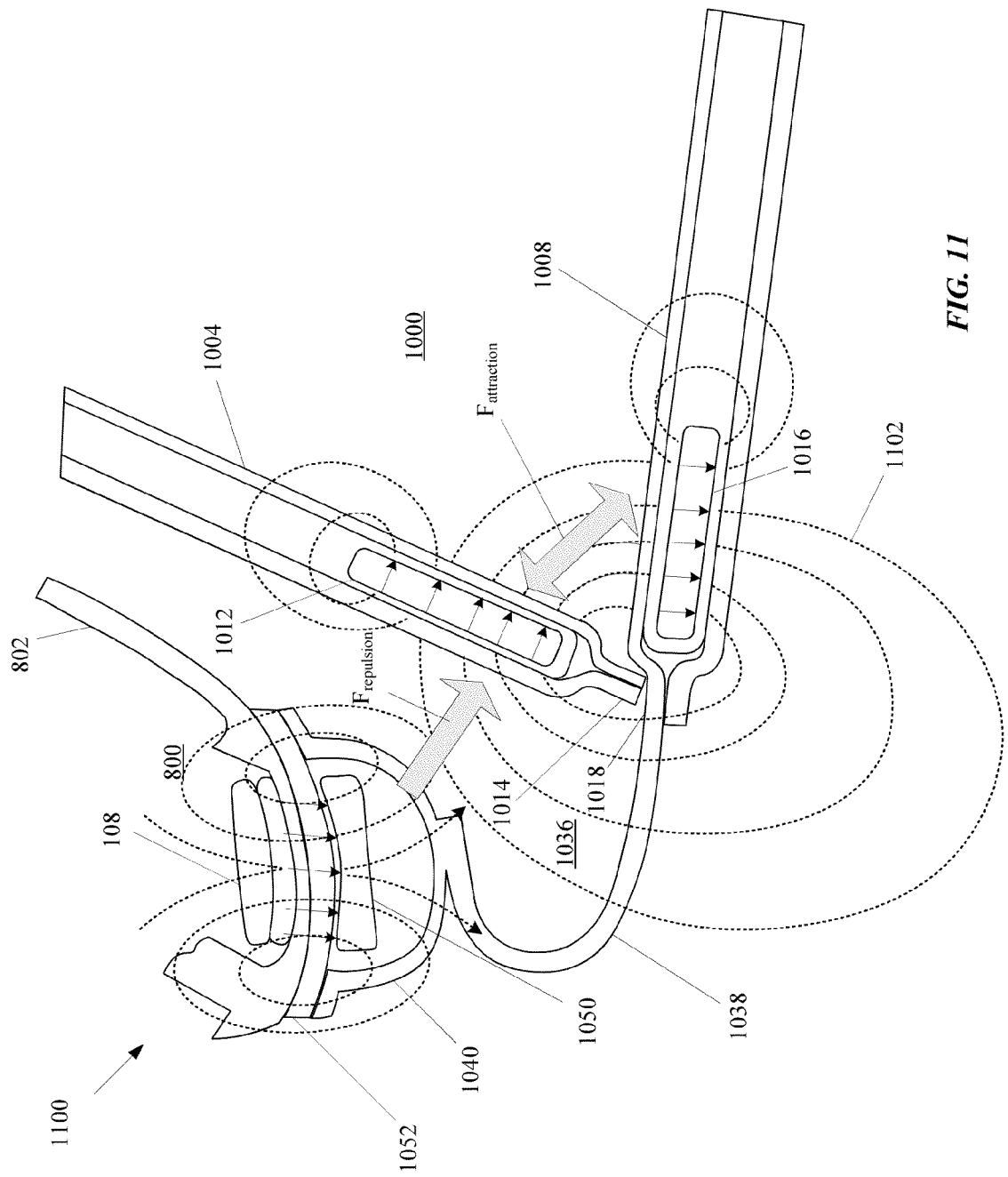
FIG. 11 shows representation of hinge assembly coupled to tablet device forming as part of a triangular support structure illustrating representative magnetic interaction mechanisms.

FIG. 11 also illustrates representative magnetic interaction between edge attach magnets 1012 and 1016 in accordance with magnetic circuit 1102. Magnetic circuit 1102 can be associated with magnetic attraction force $F_{attraction}$. Magnetic attraction force 1104 can correspond with magnetic flux density associated with magnetic field lines 1106. For example, the magnetic flux density associated with magnetic circuit 1102 in region A (where magnets 1012 and 1016 are closest together) can be greater than the magnetic flux density in region B where magnets 1012 and 1016 are further apart. In this way, magnetic attraction force 1104 between segment 1008 and 1004 can be strongest in region A. Moreover, a magnetic interaction between magnet 1012 and magnets 1050 and 108 can be such that net repulsive force Fr can be applied to segment 1004 that increases the net attachment force between segments 1004 and 1008. In other words, the total attachment force between segments 1004 and 1008 can be the aggregate of magnetic attraction force $F_{attraction}$ and magnetic repulsion force $F_{repulsion}$.

Figure 12C:
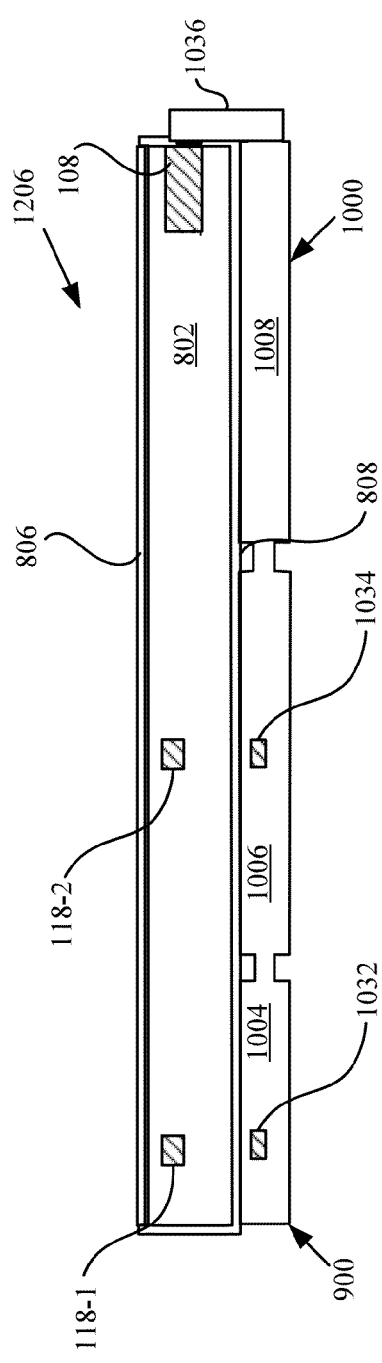

FIGS. 12A-12D show representative cross sectional views of segmented cover assembly 1000/tablet device 800 along line AA shown in FIG. 10A. In particular, FIG. 12A shows cover assembly 1000 in fully closed configuration 1200 in which interior surface 1204 of cover assembly 1000 comes in full contact with cover glass 806 of tablet device 800. In fully closed configuration 1200, Hall Effect sensor 118-1 can detect a magnetic field provided by sensor magnet 1032. Concurrently Hall Effect sensor 118-2 can detect a magnetic field provided by sensor magnet 1034. In this way, the processor can use the detection information provided by Hall Effect sensors 118-1/118-2 to determine a folded configuration of cover 1000 and the associated spatial relationship between cover 1000 and tablet device 800. For example, using the detection information from Hall Effect sensors 118-1/118-2, the processor determines that cover 1000 is in fully closed configuration 1200 where interior surface 1204 of cover 1000 is in full contact with cover glass 806. In this way, once the processor has determined the spatial relationship between cover 1000 and tablet device 800, the processor can cause tablet device 800 to operate in a manner in accordance with the determined spatial relationship. For example, when the processor determines that cover 1000 is in fully closed configuration 1200, the associated spatial relationship is one where interior surface 1204 is in full contact with cover glass 806 thereby rendering the display and any visual content presented thereon as being un-viewable. Accordingly, the processor can direct that tablet device 800 disable or at least prevent visual from being presented by the un-viewable display. This can be referred to as a sleep mode.

FIG. 12B shows partially open configuration 1202 where segment 1004 is folded away from cover glass 806 in such a way that portion 806-1 of display is rendered viewable. In partially open configuration 1202, Hall Effect sensor 118-1 can not detect the magnetic field provided by sensor magnet 1032 since any magnetic field from magnet 1032 at Hall Effect sensor 118-1 is not greater that a minimum detection threshold. In this case, the processor can use detection information from Hall Effect sensor 118-2 and Hall Effect sensor 118-2 to deduce that only segment 1004 is folded away from cover glass 806 revealing portion 806-1 of cover glass 806. In this way, only that portion of the display corresponding to portion 806-1 is viewable. In this situation, the processor can cause tablet device 800 to operate in a manner in accordance with partially open configuration 1202. In one embodiment, tablet device 800 can operate in such a way that although the display remains fully active, visual content is presented only at the viewable portion of the display that corresponds to portion 806-1. In an alternative embodiment, all but the viewable portion of the display can be de-activated. In this way, power can be conserved. In yet another alternative embodiment, visual content such as a graphical user interface, or GUI, can be altered in such a way to accommodate the reduced visual display area. For example, an amount of video resources allocated to display the GUI can be modified to take into account the reduced display area. The video resources can include number of pixels, pixel depth, and so forth.

It should be noted that in the case where neither Hall Effect sensors 118-1 or 118-2 detect either sensor magnet 1032 or 1034, then cover 1000 can be in one of two possible states. A first state being the fully open configuration in which substantially all of cover glass 806 is revealed such that substantially of the display assembly can present visual content. However, a second state (also referred to as extended peek mode) can be associated with segments 1004 and 1006 being folded away from cover glass 806 but segment 1008 remains in place. The fully open configuration can be distinguished from the extended peek state by determining if cover 1000 is magnetically attached to tablet device 800. This determination can be accomplished using magnetically sensitive circuits such as compass 120. If a magnetic offset consistent with the presence of magnetic attachment feature 108 being in active mode is experienced by compass 120, then the processor can infer that cover 1000 is magnetically attached to tablet device 800 and in so doing can alter the operation of tablet device 800 in accordance with the extended peek mode (such as presenting visual content at a viewable part of the display assembly).

Figure 12D:
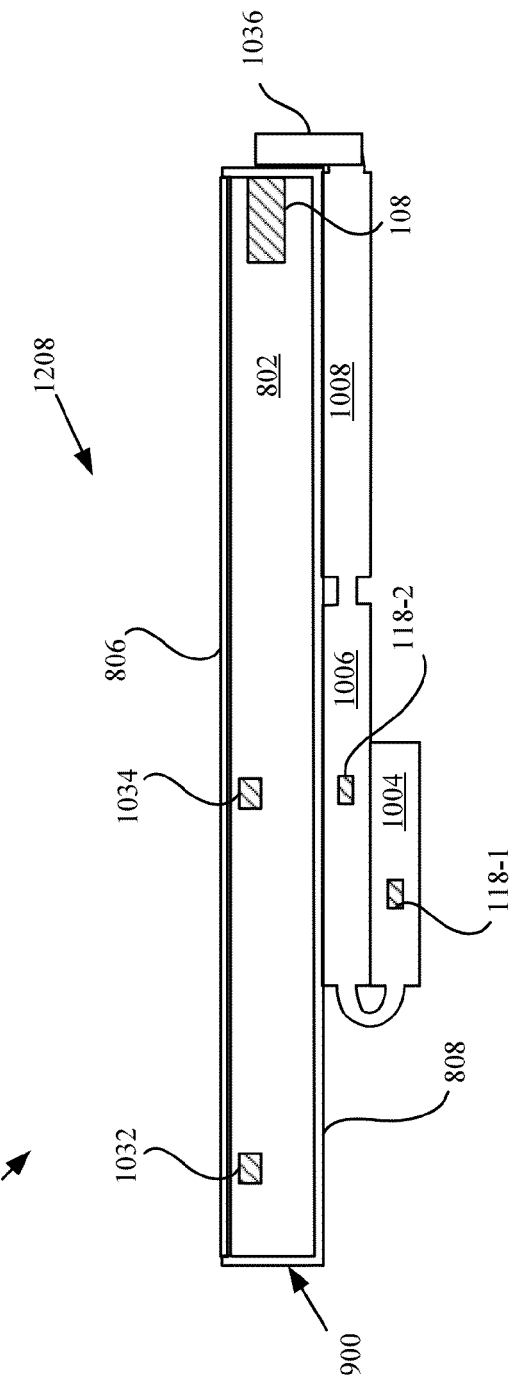

FIGS. 12C and 12D show embodiments whereby cover 1000 is folded in such a way that interior surface 1204 is in contact with rear surface 808 of tablet device 800 in first reverse folded configuration 1206. Reverse folded configuration 1206 can be useful in those situations where tablet device 800 includes a camera or other such imaging device. In this way, a user can hold tablet device 800 using reverse folded configuration 1206 enabling use the display assembly as a viewfinder that can be used to compose an image or video. It should be noted that magnetic detection circuits such as Hall Effect sensor 118-1 and Hall Effect sensor 118-2 can be configured in such a way that in reverse folded configuration 1206, only one of the magnetic detection circuits can detect a corresponding magnet in cover 1000. For example, in reverse folded configuration 1206, Hall Effect sensor 118-1 can detect magnet 1032 whereas Hall Effect sensor 118-2 can not detect magnet 1034. This variation in detectability can be accomplished by, for example, varying the magnetic properties of the magnets or by providing a magnetic shield that reduces a magnetic field that emanates from rear surface 806 in the vicinity of Hall Effect sensor 118-2.

Accordingly, when Hall Effect sensor 118-1 detects magnet 1032 and Hall Effect sensor 118-2 does not detect magnet 1034, then tablet device 800 can operate in accordance with first reverse folded configuration 1206. For example, in reverse folded configuration 1206, tablet device 800 can operate in a manner that facilitates use of the display assembly as a view finder. In an alternative embodiment shown in FIG. 12D in which cover 1000 is in second reverse folded configuration also referred to as rear camera folded configuration 1208, neither Hall Effect sensor 118-1 nor Hall Effect sensor 118-2 can detect magnets 1032 or 1034. In this arrangement, an attachment detection device (such as compass 120) can be used to detect if cover 1000 is magnetically attached to tablet device 800. In this way, when it is determined that tablet device 800 is attached to cover 1000 and cover 1000 is in second reverse folded configuration 1208, then tablet device 800 can operate accordingly. Table 1 summarizes some of the relationships between detection signals provided by HFX sensors 118-1 and 118-2 and the corresponding spatial relationship between cover 1000 and tablet device 800 in terms of a folded configuration of cover 1000.

TABLE 1

| Folded Configuration | HFX 118-1 Detection | HFX 118-2 Detection |
|---|---|---|
| Fully Closed | (D)etect | (D)etect |
| Peek Mode | (N)o (D)etect | (D)etect |
| First Reverse Folded | (D)etect | (N)o (D)etect |
| Reverse Camera Folded | (N)o (D)etect | (N)o (D)etect |

In addition to providing protection to tablet device 800, segmented cover assembly 1000 can be manipulated to form useful support structures. Accordingly, FIGS. 13 through 15 show useful arrangements of cover assembly 1000 in accordance with the described embodiments.

Figure 13A:
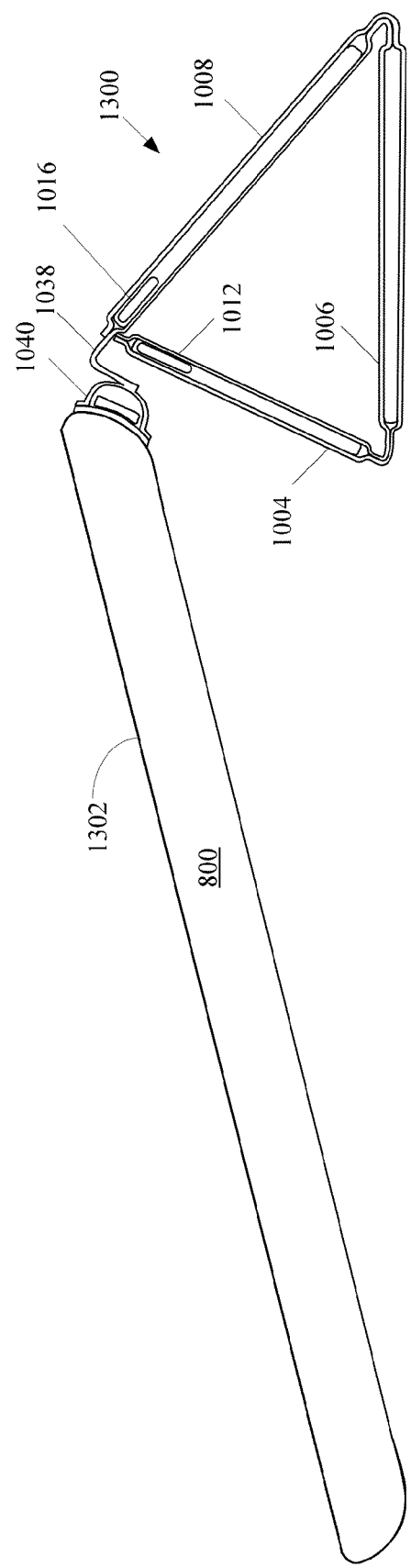
FIGS. 13A-13B show a side view of a segmented cover configured to support a tablet device in a keyboard state.
Figure 13B:
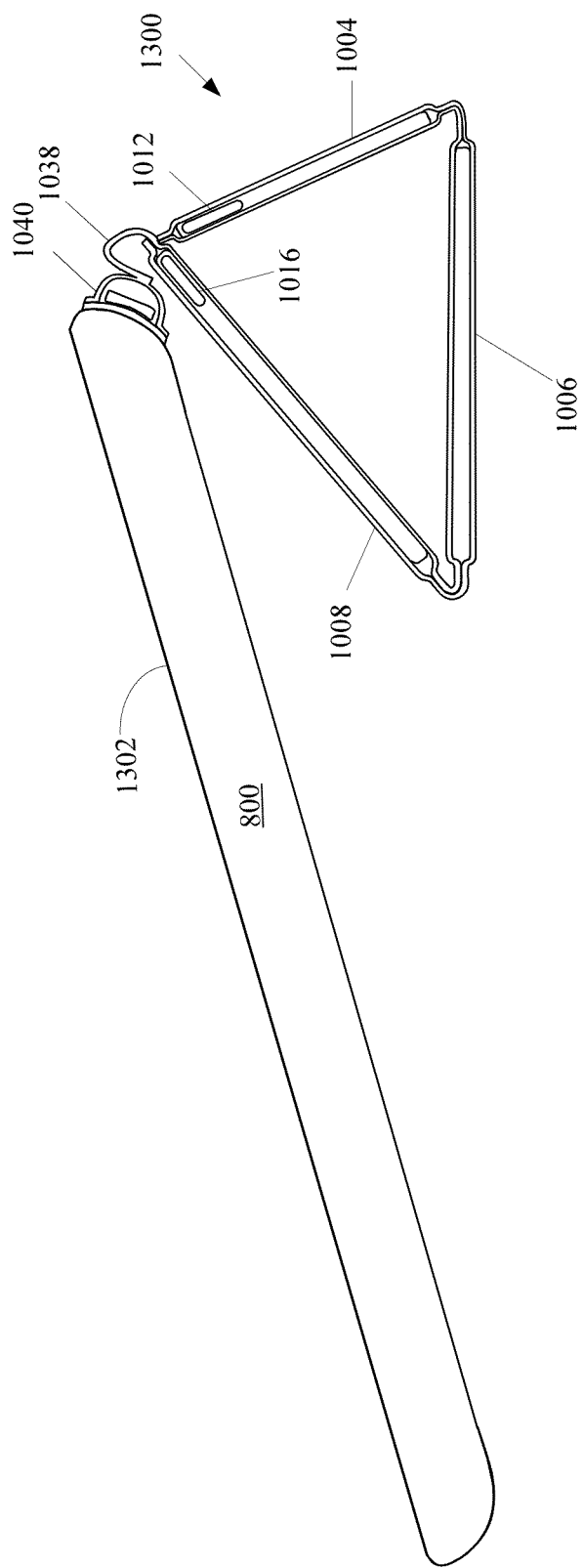

FIGS. 13A-13B show a side view of a segmented cover configured to support a tablet device in a keyboard state. As shown in FIGS. 13A and 13B, segmented cover assembly 1000 can be folded into first triangular structure 1300 by forming in one embodiment, magnetic circuit 1102 by bringing segment 1004 and 1008 in proximity to each other (it should be noted that a friction coupling between the segments can also suffice to form triangular structure 1300). Triangular structure 1300 can be formed that can be used in many ways to augment tablet device 800. For example, triangular structure 1300 can be used to support tablet device 800 in such a way that a touch sensitive surface disposed beneath cover glass 806 is positioned relative to a support surface at an ergonomically advantageous angle. In this way, using the touch sensitive surface can be a user friendly experience. This is particularly relevant in those situations where the touch sensitive surface is used over an extended period of time. For example, a virtual keyboard can be presented at the touch sensitive surface. The virtual keyboard can be used to input data to tablet device 800. By using triangular structure 1300 to support tablet device 800 at the ergonomically friendly angle, the deleterious effects of repetitive movements can be reduced or even eliminated. In the described embodiment, presentation angle θ can be in the range of 5° to 15°. FIG. 13B shows an alternative embodiment where cover 1000 is folded into second triangular structure 1302 in which segment 1004 is viewable in contrast to first triangular structure 1300 where segment 1004 was obscured from view by tablet device 800 and segment 1008 is viewable.

Figure 14A:
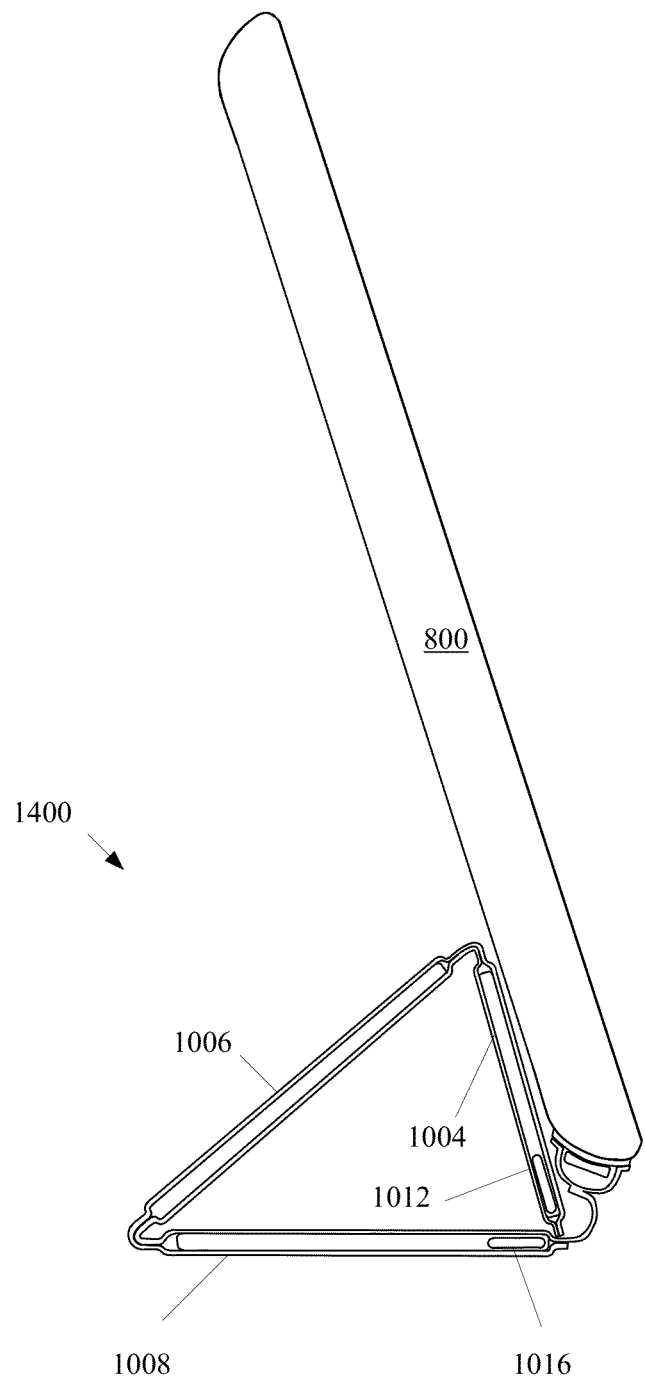
FIGS. 14A-14C show side and perspective views, respectively, of the segmented cover configured to support a tablet device in a display state.
Figure 14B:
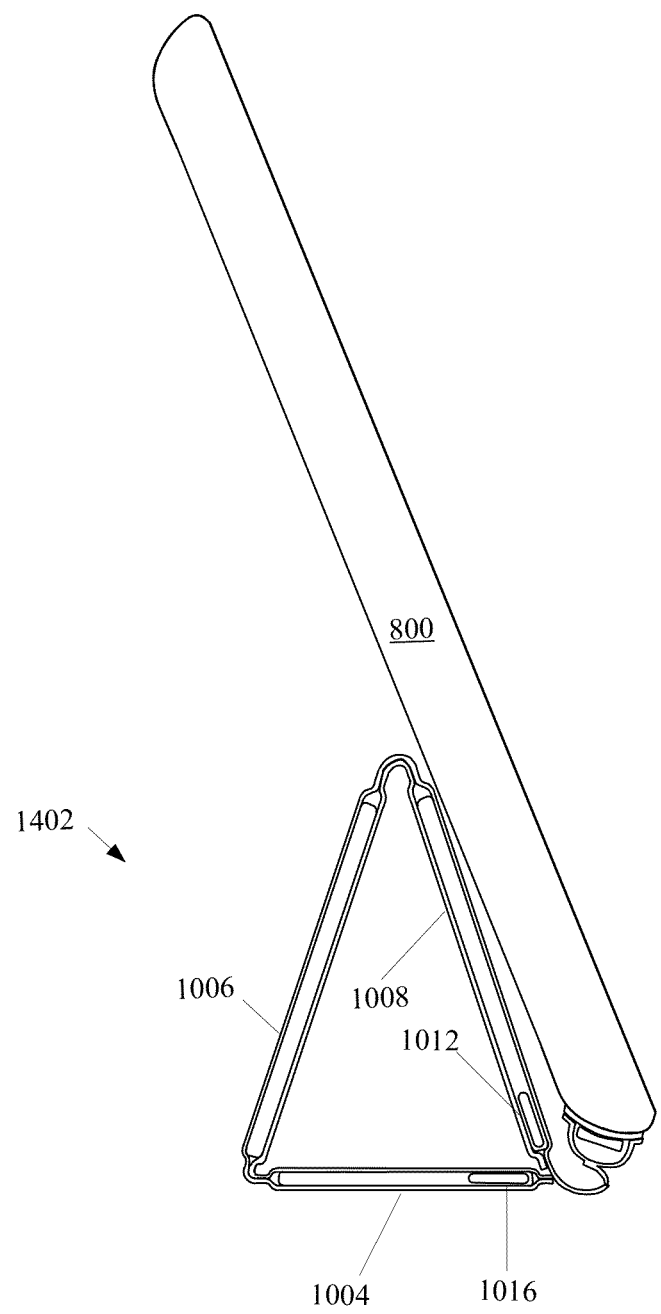
Figure 14C:
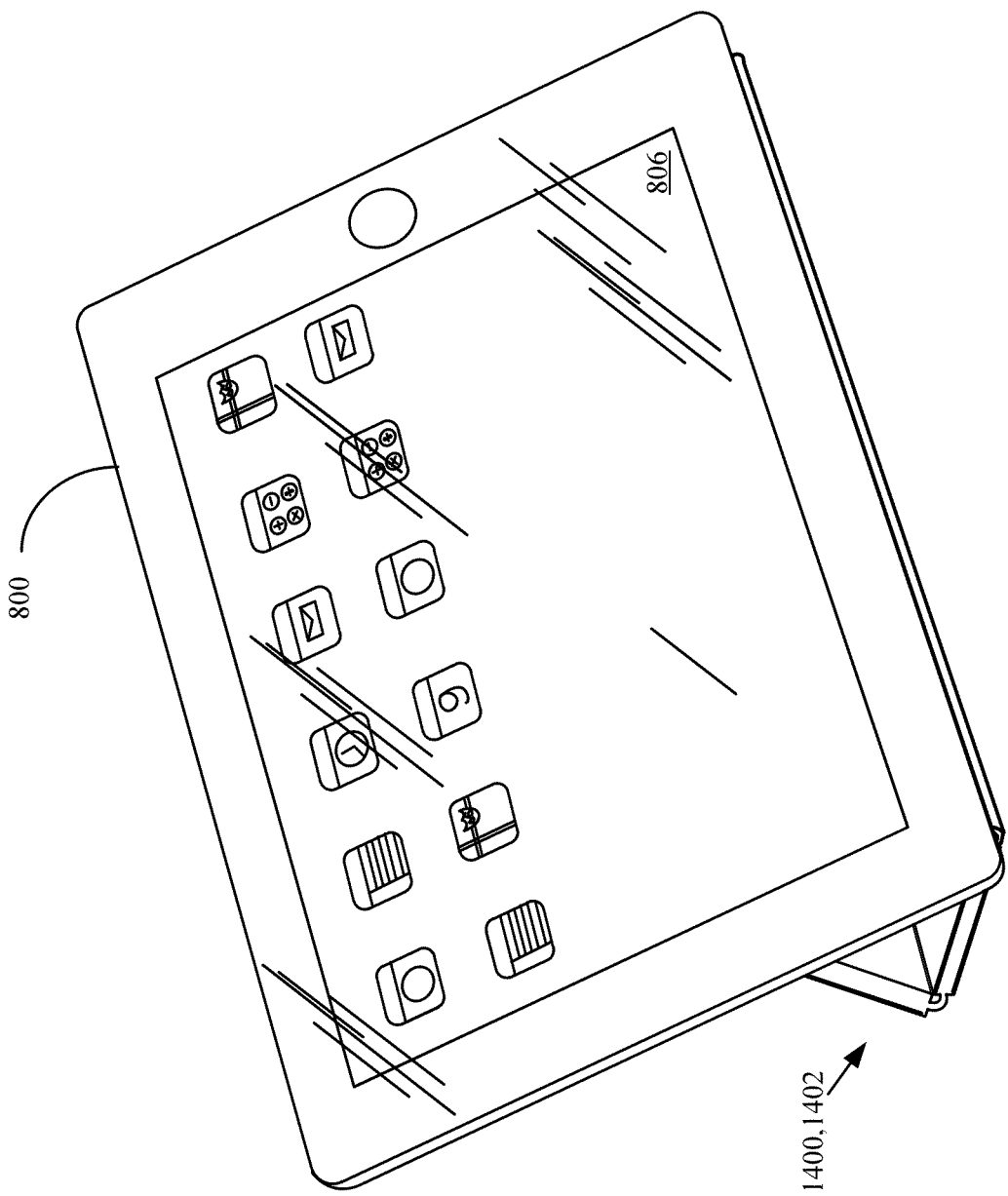

FIGS. 14A and 14B shows another folded configuration of segmented cover assembly 1000 in which triangular support structure 1400 can be used to support tablet device 800 in a viewing state. By viewing state it is meant that triangular structure 1400 can support tablet device 800 in such a way that the display assembly can present visual content (visual, stills, animation, etc.). For example, in a first display configuration triangular support structure can support tablet device 800 such that the display assembly can present visual content at a presentation angle of about 65° to about 85°. In this "kickstand" state, visual content can be presented for easy viewing. FIG. 14B illustrates another arrangement of cover 1000 in the form of triangular support structure 1402 in which tablet device 800 can be supported in manner such that the display assembly presents visual content. FIG. 14C shows a front view of tablet device 800 supported in the viewing state in accordance with the described embodiments.

Figure 15A:
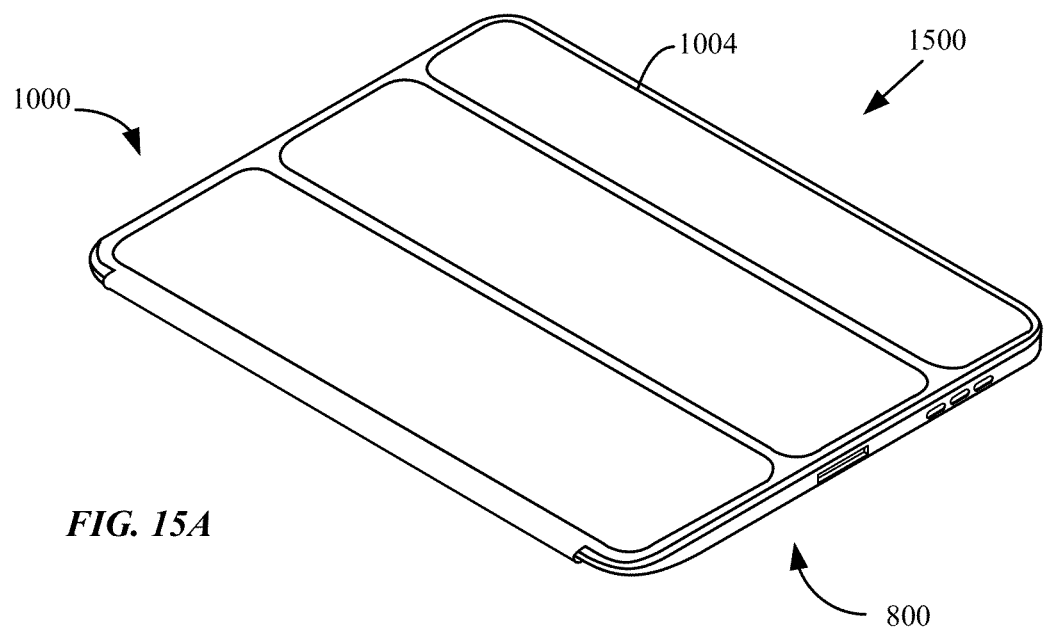
FIGS. 15A-15B shows cover assembly and tablet device in peek mode.
Figure 15B:
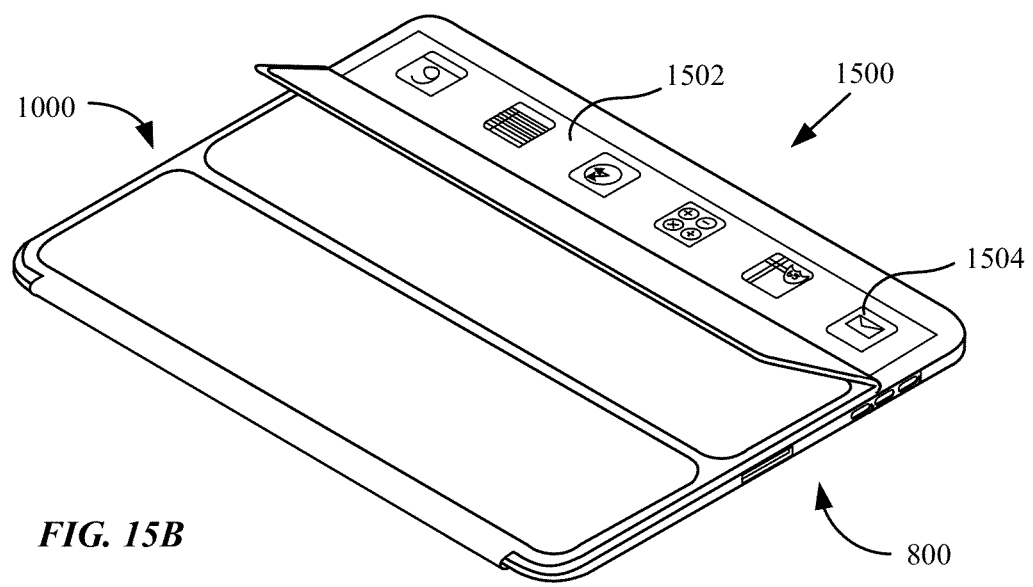

FIGS. 15A-15B show configuration 1500 of cover assembly 1000 and tablet device 800 illustrating what is referred to as a peek mode of operation of tablet device 800. More particularly, when segment 1004 is lifted from glass cover 806, sensors in tablet device 800 can detect that segment 1004 and only that segment has been lifted from glass layer 806. Once detected, tablet device 800 can activate only the exposed portion 1502 of the display. For example, tablet device 800 can utilize a Hall Effect sensor to detect that segment 1004 has been lifted from glass cover 806. Additional sensors, such additional Hall Effect sensor or other type sensors such as optical sensors (ambient light sensor, for example) can then detect if only segment 1004 has been lifted or if additional segments have been lifted.

As shown in FIG. 15B, when tablet device 800 has determined that only segment 1004 has been lifted, then tablet device 800 can change operating state to "peek" state in which only the exposed portion 1502 of the display actively presents visual content in the form of icons 1504. Hence, information in the form of visual content such as time of day, notes, and so forth can be presented for viewing on only that portion of display viewable. Once the sensors detect that segment 1004 has been placed back on glass layer 806, tablet device 800 can return to the previous operational state such as a sleep state. Furthermore, in another embodiment, when an icon arranged to respond to a touch is displayed, then that portion of a touch sensitive layer corresponding to the visible portion of the display can also be activated.

Furthermore, as additional segments are lifted from cover glass 806 to further expose additional portions of cover glass 806, additional portions of the display can be activated corresponding to the lifted segments. In this way, in the "extended" peek mode, additional visual information can be presented in the portions of the display activated. In this way, as segments are lifted from cover glass 806, additional segments of the display can be activated providing the extended peek modes in accordance with the number of foldable segments. Alternatively, the tablet device 900 can respond to the signals from the Hall Effect sensor(s) by simply powering up the display when the flap is moved away from the display and power down (sleep) when the display is covered by the flap.

Figure 16:
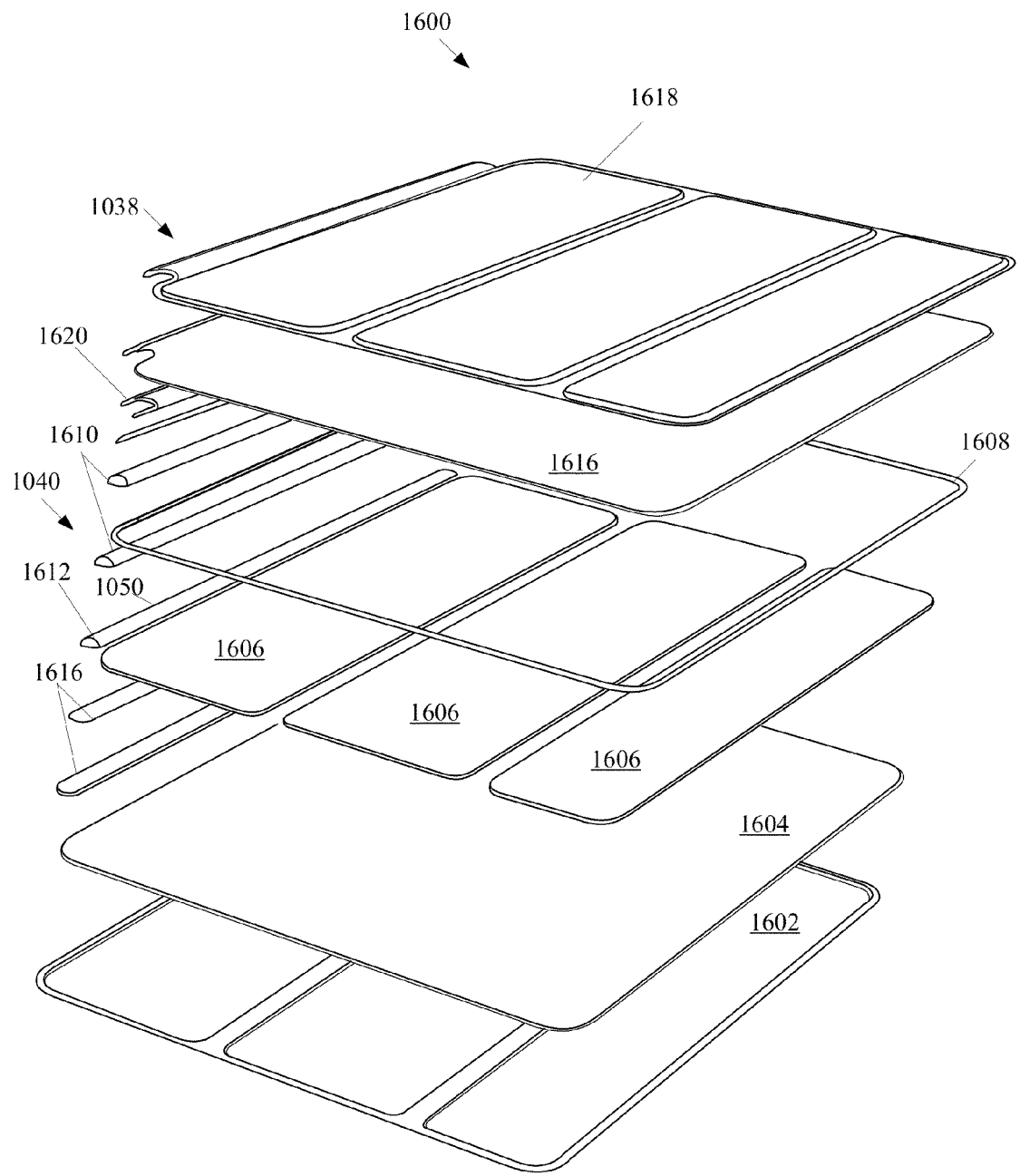
FIG. 16 shows an exploded view of segmented cover.

FIG. 16 shows an exploded view 1600 of segmented cover 1000. Bottom layer 1602 can come in direct contact with a protected surface such as a cover glass for a display. Bottom layer 1602 can be formed of a material that can passively clean the protected surface. The material can be, for example, a microfiber material. Bottom layer 1602 can be attached to stiffening layer 1604 formed of resilient material such as plastic. Stiffening layer 1604 can, in turn, be adhesively attached to inserts 1606 to form a laminate structure. Inserts 1606 can be formed of resilient material such as plastic. It should be noted that although not shown, some of inserts 1606 can accommodate embedded components such as holding magnet 1028, sensor magnets 1032 and 1034, and so on. Edge support ring 1608 can be used to provide lateral stability to cover 1000. Magnetic assembly 1040 can be attached to flexible hinge portion 1038 using adhesive layers 1610. Magnetic assembly 1040 can include magnets 1050 supported by span 1608. Span 1612 can be formed of a strong resilient material such as 304 SUS. It should be noted that in some embodiments, metal portions of 1612 can be sand-blasted in order to facilitate bonding between span 1612 and protective layer 1602 using adhesive layers 1616. In a particular embodiment, span 1612 can be attached to protective layers 1602 using pressure sensitive adhesive, or PSA. An additional laminate structure can be formed of resilient material 1616 and top layer 1618. In some embodiments, an intervening layer of material can be provided having a knitted structure that can aid in the attachment of top layer 1618 to resilient material 1616. Top layer 1618 can be formed of many materials such as plastic, leather, and so forth in keeping with the overall look and feel of tablet device 800. In order to provide additional structural support, edge stiffener ring 1608 can be used to reinforce edges of cover 1000. Edge stiffener ring 1608 can be formed of plastic or other rigid or semi-rigid material. It should be noted that in order to preserve the aesthetic look of cover 1000, cosmetic finish 1620 can be used to cover portions of magnetic assembly 1040.

Figure 17:
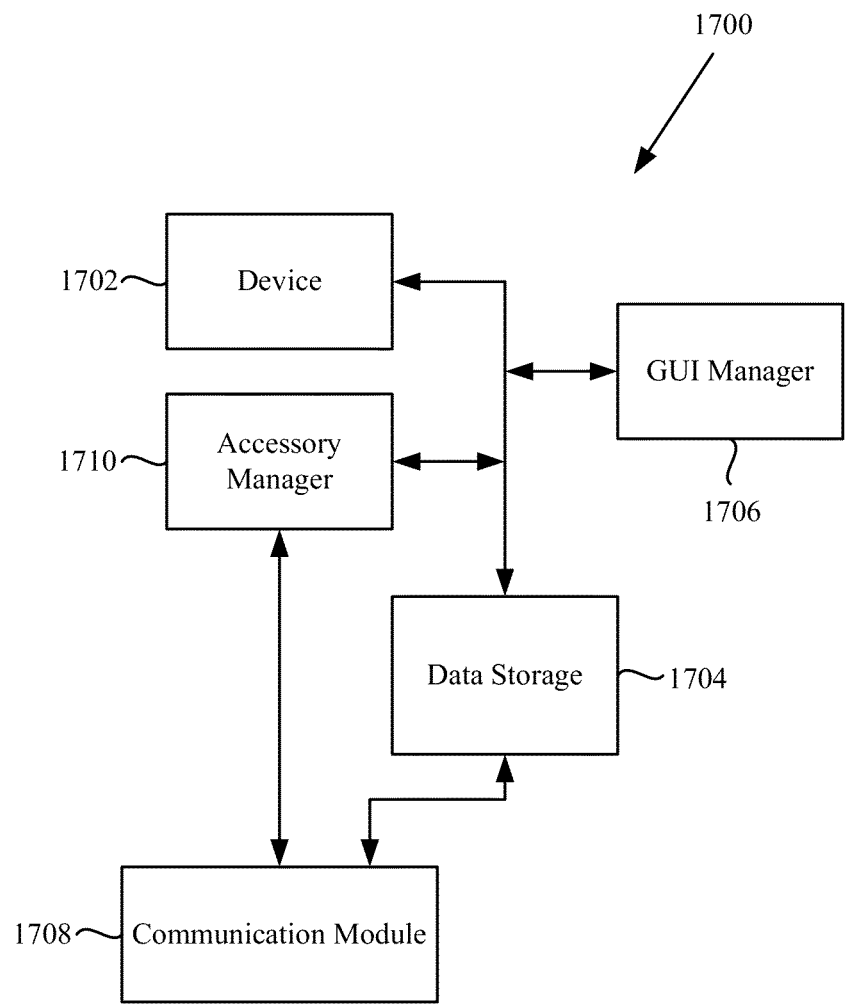
FIG. 17 is a block diagram of an arrangement of functional modules utilized by a portable media device.

FIG. 17 is a block diagram of an arrangement 1700 of functional modules utilized by an electronic device. The electronic device can, for example, be tablet device 900. The arrangement 1700 includes an electronic device 1702 that is able to output media for a user of the portable media device but also store and retrieve data with respect to data storage 1704. The arrangement 1700 also includes a graphical user interface (GUI) manager 1706. The GUI manager 1706 operates to control information being provided to and displayed on a display device. The arrangement 1700 also includes a communication module 1708 that facilitates communication between the portable media device and an accessory device. Still further, the arrangement 1700 includes an accessory manager 1710 that operates to authenticate and acquire data from an accessory device that can be coupled to the portable media device.

Figure 18:
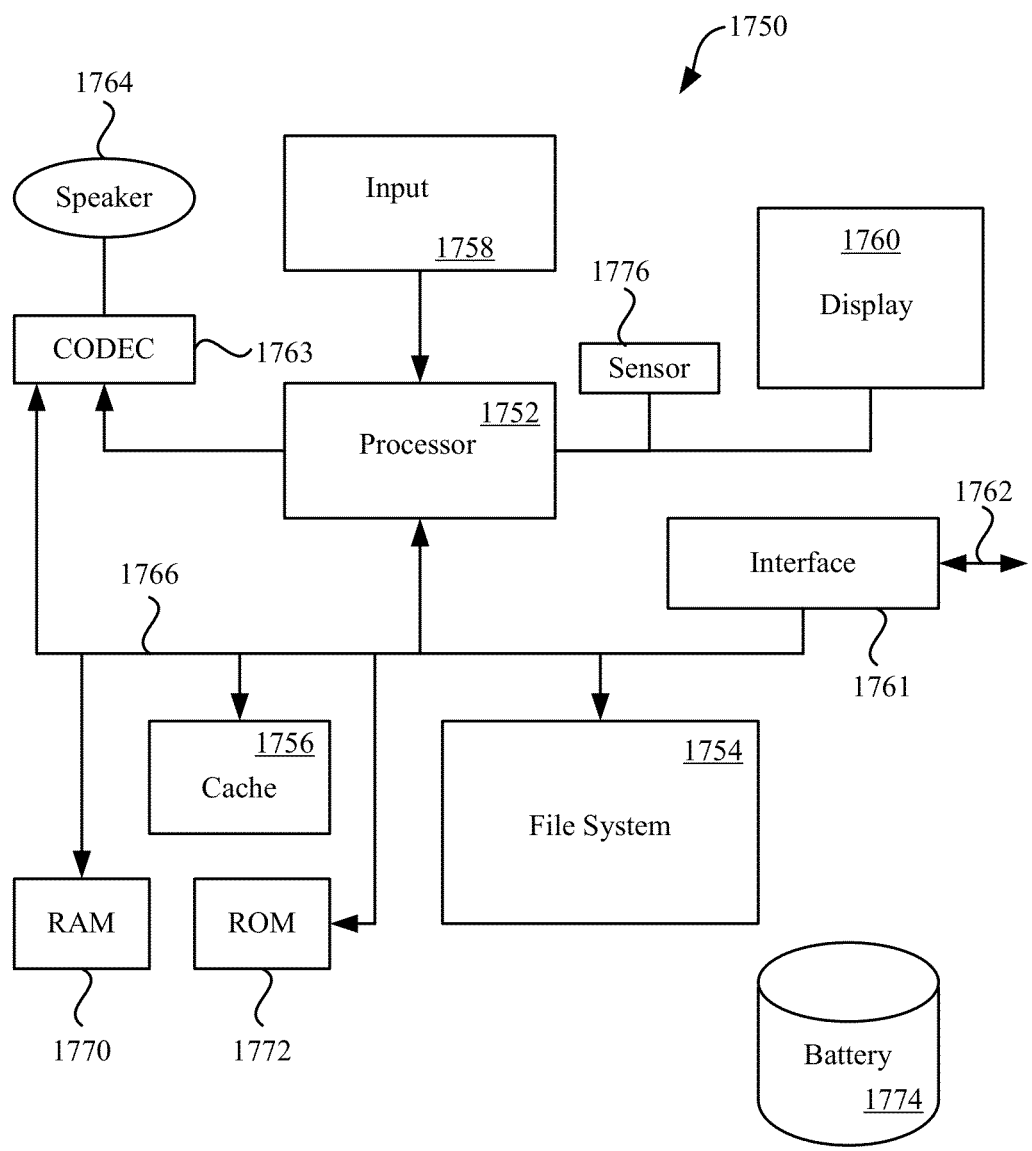
FIG. 18 is a block diagram of an electronic device suitable for use with the described embodiments.

FIG. 18 is a block diagram of an electronic device 1750 suitable for use with the described embodiments. The electronic device 1750 illustrates circuitry of a representative computing device. The electronic device 1750 includes a processor 1752 that pertains to a microprocessor or controller for controlling the overall operation of the electronic device 1750. The electronic device 1750 stores media data pertaining to media items in a file system 1754 and a cache 1756. The file system 1754 is, typically, a storage disk or a plurality of disks. The file system 1754 typically provides high capacity storage capability for the electronic device 1750. However, since the access time to the file system 1754 is relatively slow, the electronic device 1750 can also include a cache 1756. The cache 1756 is, for example, Random-Access Memory (RAM) provided by semiconductor memory. The relative access time to the cache 1756 is substantially shorter than for the file system 1754. However, the cache 1756 does not have the large storage capacity of the file system 1754. Further, the file system 1754, when active, consumes more power than does the cache 1756. The power consumption is often a concern when the electronic device 1750 is a portable media device that is powered by a battery 1774. The electronic device 1750 can also include a RAM 1770 and a Read-Only Memory (ROM) 1772. The ROM 1772 can store programs, utilities or processes to be executed in a non-volatile manner. The RAM 1770 provides volatile data storage, such as for the cache 1756.

The electronic device 1750 also includes a user input device 1758 that allows a user of the electronic device 1750 to interact with the electronic device 1750. For example, the user input device 1758 can take a variety of forms, such as a button, keypad, dial, touch screen, audio input interface, visual/image capture input interface, input in the form of sensor data, etc. Still further, the electronic device 1750 includes a display 1760 (screen display) that can be controlled by the processor 1752 to display information to the user. A data bus 1766 can facilitate data transfer between at least the file system 1754, the cache 1756, the processor 1752, and the CODEC 1763.

In one embodiment, the electronic device 1750 serves to store a plurality of media items (e.g., songs, podcasts, etc.) in the file system 1754. When a user desires to have the electronic device play a particular media item, a list of available media items is displayed on the display 1760. Then, using the user input device 1758, a user can select one of the available media items. The processor 1752, upon receiving a selection of a particular media item, supplies the media data (e.g., audio file) for the particular media item to a coder/decoder (CODEC) 1763. The CODEC 1763 then produces analog output signals for a speaker 1764. The speaker 1764 can be a speaker internal to the electronic device 1750 or external to the electronic device 1750. For example, headphones or earphones that connect to the electronic device 1750 would be considered an external speaker.

The electronic device 1750 also includes a network/bus interface 1761 that couples to a data link 1762. The data link 1762 allows the electronic device 1750 to couple to a host computer or to accessory devices. The data link 1762 can be provided over a wired connection or a wireless connection. In the case of a wireless connection, the network/bus interface 1761 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1776 can take the form of circuitry for detecting any number of stimuli. For example, sensor 1776 can include a Hall Effect sensor responsive to external magnetic field, an audio sensor, a light sensor such as a photometer, and so on.

The magnetic attachment feature can be used to magnetically attach at least two objects. The objects can take many forms and perform many functions. When magnetically attached to each other, the objects can communicate and interact with each other to form a cooperative system. The cooperating system can perform operations and provide functions that cannot be provided by the separate objects individually. For example, at least a first object and a second object can be magnetically attached to each other such that the first object can be configured to provide a support mechanism to the second object. The support mechanism can be mechanical in nature. For example, the first object can take the form of a stand that can be used to support the second object on a working surface such as a table. In another example, the first object can take the form of a hanging apparatus. As such, the first object can be used to hang the second object that can then be used as a display for presenting visual content such as a visual, still images like a picture, art work, and so on. The support mechanism can also be used as a handle for conveniently grasping or holding the second object. This arrangement can be particularly useful when the second object can present visual content such as images (still or visual), textual (as in an e-book) or has image capture capabilities in which case the second object can be used as an image capture device such as a still or visual camera and the first object can be configured to act as a support such as a tripod or handle.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A cover configured for releasably attaching to a tablet device having a display and associated top protective layer, a plurality of sensors, and a processor coupled to the display and the plurality of sensors, comprising:

a flap having a size and shape in accordance with the top protective layer, the flap comprising:

a first sensor magnet having a first size located at a first position in the flap and detectable through the top protective layer by a first sensor when the flap is in a closed configuration; and a second sensor magnet having a second size located at a second position in the flap, the second position different than the first position, the second sensor magnet being detectable through the top protective layer by a second sensor different from the first sensor in the closed configuration, wherein the first size and the second size are such that the first and second magnets remain detectable by the first and second sensors, respectively, regardless an amount of racking that the flap undergoes in the closed configuration.

2. The cover as recited in claim 1, wherein the first size is related to a first radial distance and a corresponding racking angle of the first sensor magnet.

3. The cover as recited in claim 2, wherein the second size is related to a second radial distance and the corresponding racking angle of the second sensor magnet.

4. The cover as recited in claim 3, wherein a first arc length defined by the first radial distance and the racking angle correspond to the first size.

5. The cover as recited in claim 3, wherein a second arc length defined by the second radial distance and the racking angle correspond to the second size.

6. The cover as recited in claim 1, wherein when the first and/or the second magnets are detected, the processor alters an operation of the tablet device accordingly.

7. The cover as recited in claim 6, wherein by maintaining the detectability of the first and second sensor magnets in the closed configuration regardless of the amount of racking, the processor is prevented from causing the tablet device to operate in a manner inconsistent with the closed configuration.

8. The cover as recited in claim 1, wherein the first sensor is a first Hall effect sensor (HFX) and wherein the second sensor is a second HFX.

9. The cover as recited in claim 8, wherein the tablet device operates in a first peek mode when the first HFX does not detect the first sensor magnet and the second HFX detects the second sensor magnet.

10. The cover as recited in claim 9, wherein visual content is presented by the display in accordance with the first peek mode.

11. The cover as recited in claim 10, the tablet device further comprising a magnetometer configured to detect a magnetic offset indicating that the cover is magnetically attached to the tablet device.

12. The cover as recited in claim 11, wherein when the first sensor does not detect the first sensor magnet and the second sensor does not detect the second sensor magnet and the magnetic offset indicates that the cover is magnetically attached to the tablet device, the tablet device operates in a second peek mode.

13. The cover as recited in claim 12, wherein the visual content is presented in accordance with the second peek mode.

14. The cover as recited in claim 8, wherein when the first HFX detects the first sensor magnet through a back portion of the tablet device and the second HFX does not detect the second sensor magnet, then the tablet device operates in a first reverse folded mode.

15. The cover as recited in claim 14, wherein the first reverse folded mode is suitable for operating the tablet device as an image capture device.

16. The cover as recited in claim 15, wherein the image capture device is a camera.

* * * * *